United States Patent
Faxér et al.

(10) Patent No.: US 12,218,869 B2
(45) Date of Patent: Feb. 4, 2025

(54) SOUNDING REFERENCE TRANSMISSION

(71) Applicant: Telefonaktiebolaget LM Ericsson (publ), Stockholm (SE)

(72) Inventors: Sebastian Faxér, Järfälla (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/128,580

(22) Filed: Mar. 30, 2023

(65) Prior Publication Data

US 2023/0299907 A1    Sep. 21, 2023

Related U.S. Application Data

(63) Continuation of application No. 17/679,531, filed on Feb. 24, 2022, now Pat. No. 11,632,214, which is a
(Continued)

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04W 72/23* (2023.01); *G06F 3/011* (2013.01); *H04J 11/0026* (2013.01)

(58) Field of Classification Search
CPC . H04W 72/23; H04W 72/046; H04W 52/146; H04W 52/42; H04W 52/16;
(Continued)

(56) References Cited

U.S. PATENT DOCUMENTS 9,236,989 B2    1/2016  Noh
9,521,622 B2 *  12/2016 Yang ................. H04W 52/0238
(Continued)

FOREIGN PATENT DOCUMENTS

CN    102932114    2/2013
CN    103370898    10/2013
(Continued)

OTHER PUBLICATIONS

Vivo, "Discussion on Non-codebook Based UL Transmission", 3GPP TSG RAN WG1 NR Ad Hoc #3, R1-1715613, Nagoya, Japan, Sep. 2017 (6 pages).
(Continued)

*Primary Examiner* — Eva Y Puente
(74) *Attorney, Agent, or Firm* — Rothwell, Figg, Ernst & Manbeck, P.C.

(57) ABSTRACT

A method, wireless device and network node for performing sounding reference signal (SRS) transmission. According to one aspect a method includes receiving a definition of one or more SRS resource sets to be configured, comprising at least one SRS transmission setting. The method further includes receiving an indication of a selected SRS resource set to use for a SRS transmission, from the one or more configured SRS resource sets and determining a precoding configuration for the SRS transmission based on the selected SRS resource set and the at least one SRS transmission setting. The method also includes transmitting a SRS according to the determined precoding configuration.

16 Claims, 18 Drawing Sheets

Related U.S. Application Data continuation of application No. 16/652,597, filed as application No. PCT/EP2018/076649 on Oct. 1, 2018, now Pat. No. 11,265,124.

(60) Provisional application No. 62/566,604, filed on Oct. 2, 2017.

(51) Int. Cl.
  *H04W 72/23* (2023.01)
  *G06F 3/01* (2006.01)
  *H04J 11/00* (2006.01)

(58) Field of Classification Search
  CPC ............ H04W 52/325; H04W 52/346; H04W 72/0473; H04B 7/0456; H04B 7/0639; H04B 7/0626; H04B 7/0617; H04B 7/0486; H04B 7/0426; H04B 7/0404; H04B 7/0417; H04L 5/0048; H04L 5/0051; H04L 5/0023; H04L 25/0226; H04L 5/00; H04L 5/001; H04L 5/0053; H04L 5/005; H04L 5/0057
  USPC .......................................................... 370/329
  See application file for complete search history.

(56) References Cited

U.S. PATENT DOCUMENTS

| | | | |
|---|---|---|---|
| 2010/0238824 | A1 | 9/2010 | Farajidana |
| 2014/0112168 | A1 | 4/2014 | Chen et al. |
| 2014/0362941 | A1 | 12/2014 | Gomadam |
| 2015/0381246 | A1 | 12/2015 | Huang et al. |
| 2018/0026379 | A1* | 1/2018 | Barker .................. H01Q 21/28 343/844 |
| 2018/0062711 | A1* | 3/2018 | Mizusawa ............ H04B 7/0452 |
| 2018/0287757 | A1* | 10/2018 | Onggosanusi ........ H04L 5/0053 |
| 2019/0181934 | A1 | 6/2019 | Kang |
| 2020/0280409 | A1* | 9/2020 | Grant .................... H04L 5/0044 |
| 2020/0366429 | A1* | 11/2020 | Huang ................ H04W 72/542 |
| 2021/0099214 | A1 | 4/2021 | Ren |
| 2022/0070974 | A1* | 3/2022 | Zhang .................. H04W 88/06 |
| 2022/0200757 | A1 | 6/2022 | Guo |
| 2023/0273283 | A1* | 8/2023 | Kurras .................... G01S 1/024 455/456.1 |

FOREIGN PATENT DOCUMENTS

| | | |
|---|---|---|
| CN | 105991264 | 10/2016 |
| CN | 107113042 | 8/2017 |
| EP | 2 567 465 | 12/2014 |
| EP | 3 471 327 | 4/2019 |
| WO | 2012/093957 | 7/2012 |
| WO | 2018202096 | 11/2018 |
| WO | 2018203653 | 11/2018 |

OTHER PUBLICATIONS

Nokia et al., "Non-codebook based UL-MIMO transmission", 3GPP TSG-RAN WG1 Meeting NR#3, R1-1716491, Nagoya, Japan, Sep. 2017 (6 pages).

ZTE, "On transmission setting", 3GPP TSG RAN WG1 Meeting #90, R1-1712291, Prague, Czechia, Aug. 2017 (6 pages).

ZTE, ZTE Microelectronics, "UL beam management", 3GPP TSG RAN WG1 Meeting #88bis, R1-1704399, Spokane, USA, Apr. 2017 (4 pages).

LG Electronics, "Discussion on UL beam management", 3GPP TSG RAN WG1 Meeting #88bis, R1-1704878, Spokane, USA, Apr. 2017 (6 pages).

International Search Report and Written Opinion issued in International Application No. PCT/EP2018/076649 dated Dec. 10, 2018 (13 pages).

Vivo, "Discussion on Non-codebook Based UL Transmission", 3GPF TSG RAN WG1 NR Ad Hoc #3, R1-1715613, Nagoya, Japan, Sep. 18-21, 2017 (6 pages).

* cited by examiner

SOUNDING REFERENCE TRANSMISSION

CROSS-REFERENCE TO RELATED APPLICATIONS

This application is a continuation of U.S. application Ser. No. 17/679,531, filed on Feb. 24, 2022 (status pending), which is a continuation of U.S. application Ser. No. 16/652, 597, filed on Mar. 31, 2020 (now U.S. Pat. No. 11,265,124, issued on Mar. 1, 2022), which is a 35 U.S.C. § 371 National Stage of International Patent Application No. PCT/EP2018/076649, filed Oct. 1, 2018, designating the United States and claiming priority to U.S. provisional application No. 62/566, 604, filed on Oct. 2, 2017. The above identified applications and patent are incorporated by reference.

TECHNICAL FIELD

Embodiments herein relate generally to sounding reference signals and whether or not precoding should be applied to sounding reference signals.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in NR is the support of MIMO antenna deployments and MIMO related techniques. It is expected that NR will support uplink MIMO with at least 4 layer spatial multiplexing using at least 4 antenna ports with channel dependent precoding. The spatial multiplexing mode is aimed for high data rates in favorable channel conditions. An illustration of the spatial multiplexing operation is provided in FIG. 1 for where cyclic prefix-orthogonal frequency division multiplex (CP-OFDM) is used on the uplink. As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. For codebook based precoding the precoder matrix is typically selected from a codebook of possible precoder matrices, and is typically indicated by means of a transmit precoder matrix indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

The received $N_R \times 1$ vector $y_n$ for a certain TFRE on subcarrier n (or alternatively data TFRE number n) is thus modeled by:

$$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \|\hat{H}_n W_k\|_F^2 \qquad \text{Equation 2}$$

Where
$\hat{H}_n$ is a channel estimate, possibly derived from CSI-RS as described below.
$W_k$ is a hypothesized precoder matrix with index k.
$\hat{H}_n W_k$ is the hypothesized equivalent channel In closed-loop precoding for the NR uplink, the TRP may transmit, based on channel measurements in the reverse link (uplink), TPMI to the UE that the UE should use on its uplink antennas. The 5G base station (e.g. TRP, gNodeB or gNB) configures the UE to transmit SRS according to the number of UE antennas it would like the UE to use for uplink transmission to enable the channel measurements. A single precoder that is supposed to cover a large bandwidth (wideband precoding) may be signalled. It may also be beneficial to match the frequency variations of the channel and instead feed back a frequency-selective precoding report, e.g. several precoders and/or several TPMIs, one per subband.

Other information than TPMI may generally be used to determine the UL MIMO transmission state, such as SRS resource indicators (SRIs) as well as transmission rank indicator (TRIs). These parameters, as well as the modulation and coding state (MCS), and the uplink resources where physical uplink shared channel (PUSCH) is to be transmitted, may also be determined by channel measurements derived from SRS transmissions from the UE. The transmission rank, and thus the number of spatially multiplexed layers, is reflected in the number of columns of the precoder W. For optimal performance, it is important that a transmission rank that matches the channel properties is selected. This is an iterative process and relies on accurate precoder indication from the base station. In addition to codebook-based UL transmission, NR may support a non-codebook based transmission mode, which is applicable when TX/RX reciprocity holds at the UE. In the codebook-based mode, as stated earlier, the UE typically transmits a non-precoded SRS to sound the uplink channel and the base station determines a preferred precoder from the codebook based on the SRS channel estimates and instructs the UE to apply said precoder on the PUSCH transmission by means of a TPMI comprised in the UL grant.

For non-codebook based UL transmission however, the UE itself would determine one or more precoder candidates and uses said precoder candidates to precode one or more SRS in one or more SRS resources. The base station correspondingly would determine one or more preferred SRS resource and instruct the UE to use the precoder(s) applied for precoding the one or more preferred SRS resources also for the PUSCH transmission. This instruction may be signalled in the form of one or more SRI(s) comprised in a downlink control information (DCI) carrying the UL grant, but may alternatively or additionally include TRI signalling.

It is expected that large parts of future New Radio (NR) networks, e.g. as specified in 3GPP TS 38.300 V1.0.0 (2017-09) will be deployed for Time Division Duplex (TDD). One benefit with TDD (compared to Frequency Division Duplex (FDD)) is that TDD enables reciprocity based beamforming, which can be applied both at a Transmission and Reception Point (TRP) (i.e. for downlink (DL)) and a user equipment (UE) (i.e. for uplink (UL)). For reciprocity based DL transmission the UE could transmit Sounding Reference Signals (SRSs) which the TRP (e.g., a base station) will use to estimate the channel between the TRP and UE. The channel estimate will then be used at the TRP to find optimal precoding weights for the coming DL transmission, for example by using eigen beamforming.

Means for efficient UL handling of SRS and precoding configuration are needed for codebook and non-codebook based precoding.

SUMMARY

The present application provides improved channel estimation for multi-antenna/multi-layer systems and provides greater flexibility for network nodes to configure wireless devices to enable more efficient and accurate channel estimation and precoding.

In one aspect, a method performed by a wireless device for performing sounding reference signal (SRS) transmission is provided. The method comprises receiving a definition of one or more SRS resource sets to be configured, comprising at least one SRS transmission setting. The method includes receiving an indication of a selected SRS resource set to use for a SRS transmission, from the one or more configured SRS resource sets. The method further includes determining a precoding configuration for the SRS transmission based on the selected SRS resource set and the at least one SRS transmission setting. The method further includes transmitting a SRS according to the determined precoding configuration.

In some examples the determining a precoding configuration for the SRS transmission comprises determining whether codebook based precoding or non-codebook based precoding is to be applied. The determining the precoding configuration for the SRS transmission may be based on a precoding indicator. The precoding indicator may be comprised in the at least one SRS transmission setting. The precoding indicator may be a downlink reference signal, DL RS, identifier which identifies an associated DL RS.

In some examples the determining a precoding configuration for the SRS transmission comprises determining whether to apply reciprocity-based precoding for the SRS transmission. The selected SRS resource may comprises an association to a DL RS and the method further comprising determining a reciprocity-based precoder for the SRS transmission based on the associated DL RS. The SRS transmission may be an aperiodic transmission and the indication of a selected SRS resource set comprises a DL control information (DCI) indicator.

In another aspect a wireless device is provided for performing sounding reference signal (SRS) transmission. The wireless device is configured to receive a definition of one or more SRS resource sets to be configured, comprising at least one SRS transmission setting. The wireless device is further configured to receive an indication of a selected SRS resource set from the one or more configured SRS resource sets to use for a SRS transmission. The wireless device is configured to determine a precoding configuration for the SRS transmission based on the selected SRS resource set and the at least one SRS transmission setting. The wireless device is further configured to transmit a SRS according to the determined precoding configuration.

In some examples the determined precoding configuration for the SRS transmission comprises one of codebook based precoding or non-codebook based precoding. The precoding configuration for the SRS transmission may be determined based on a precoding indicator. The precoding indicator may be comprised in the at least one SRS transmission setting. In some examples the precoding indicator is a downlink reference signal, DL RS, identifier which identifies an associated DL RS. In some examples the determined precoding configuration for the SRS transmission comprises applying reciprocity-based precoding for the SRS transmission. The selected SRS resource may comprise an association to a DL RS and the wireless device may be further configured to determine a reciprocity-based precoder for the SRS transmission based on the associated DL RS. The SRS transmission may be an aperiodic transmission and the indication of a selected SRS resource set comprises a DL control information (DCI) indicator.

In another aspect, a method, performed by a network node, for managing sounding reference signal (SRS) transmission is provided. The method comprising sending, to a wireless device, a definition of one or more SRS resource sets to be configured, comprising at least one SRS transmission setting. The method including sending an indication of a selected SRS resource set from the one or more configured SRS resource sets to use for a SRS transmission, wherein the at least one SRS transmission setting corresponds to a precoding configuration for the SRS transmission. The method further comprising receiving a SRS transmission according to the corresponding precoding configuration.

In some examples the corresponding precoding configuration for the SRS transmission comprises one of codebook based precoding or non-codebook based precoding. The selected resource set may comprises a precoding indicator. The precoding indicator may be comprised in the at least one SRS transmission setting. In some examples the precoding indicator is a downlink reference signal, DL RS, identifier which identifies an associated DL RS. In some examples the corresponding precoding configuration for the SRS transmission comprises reciprocity-based precoding for the SRS transmission. The selected SRS resource may comprise an association to a DL RS and the corresponding precoding configuration comprises reciprocity-based precoding based on the associated DL RS. The SRS transmission may be an aperiodic transmission and the indication of a selected SRS resource set comprises a DL control information (DCI) indicator.

In another aspect, a network node for managing sounding reference signal (SRS) transmission is provided. The network node is configured to send, to a wireless device, a definition of one or more SRS resource sets to be configured, comprising at least one SRS transmission setting. The network node is further configured to send a definition of a selected SRS resource set from the one or more configured SRS resource sets to use for a SRS transmission, wherein the at least one SRS transmission setting corresponds to a precoding configuration for the SRS transmission. The network node is configured to receive a SRS transmission according to the corresponding precoding configuration.

In some examples, the corresponding precoding configuration for the SRS transmission comprises one of codebook based precoding or non-codebook based precoding. The selected resource set may comprise a precoding indicator.

The precoding indicator may be comprised in the at least one SRS transmission setting. The precoding indicator may be a downlink reference signal, DL RS, identifier which identifies an associated DL RS. In some examples the corresponding precoding configuration for the SRS transmission comprises reciprocity-based precoding for the SRS transmission. The selected SRS resource may comprise an association to a DL RS and the corresponding precoding configuration comprises reciprocity-based precoding based on the associated DL RS. The SRS transmission may be an aperiodic transmission and the indication of a selected SRS resource set comprises a DL control information (DCI) indicator.

In another aspect, a user equipment apparatus is provided. The user equipment comprising processor circuitry, memory in the form of device readable medium and a transceiver. The transceiver is configured to receive an indication of one or more SRS resource sets to be configured, comprising at least one SRS transmission setting. The transceiver is further configured to receive an indication of a selected SRS resource set from the one or more configured SRS resource sets to use for a SRS transmission. The processing circuitry is configured to determine a precoding configuration for the SRS transmission based on the selected SRS resource set and the at least one SRS transmission setting. The transceiver is further configured to transmit a SRS according to the determined precoding configuration.

In another aspect, a base station apparatus is provided. The base station comprising processor circuitry, memory in the form of a device readable medium and transceiver circuitry. The transceiver circuitry is configured to send, to a wireless device, a definition of one or more SRS resource sets to be configured, comprising at least one SRS transmission setting. The transceiver circuitry is also configured to send an indication of a selected SRS resource set from the one or more configured SRS resource sets to use for a SRS transmission, wherein the at least one SRS transmission setting corresponds to a precoding configuration for the SRS transmission. The transceiver circuitry is further configured to receive a SRS transmission according to the corresponding precoding configuration.

In another aspect a device readable medium is provided. The device readable medium comprising instructions which, when executed by processing circuitry, cause the processing circuitry to perform any one of the methods previously presented.

DETAILED DESCRIPTION

Figure 1:
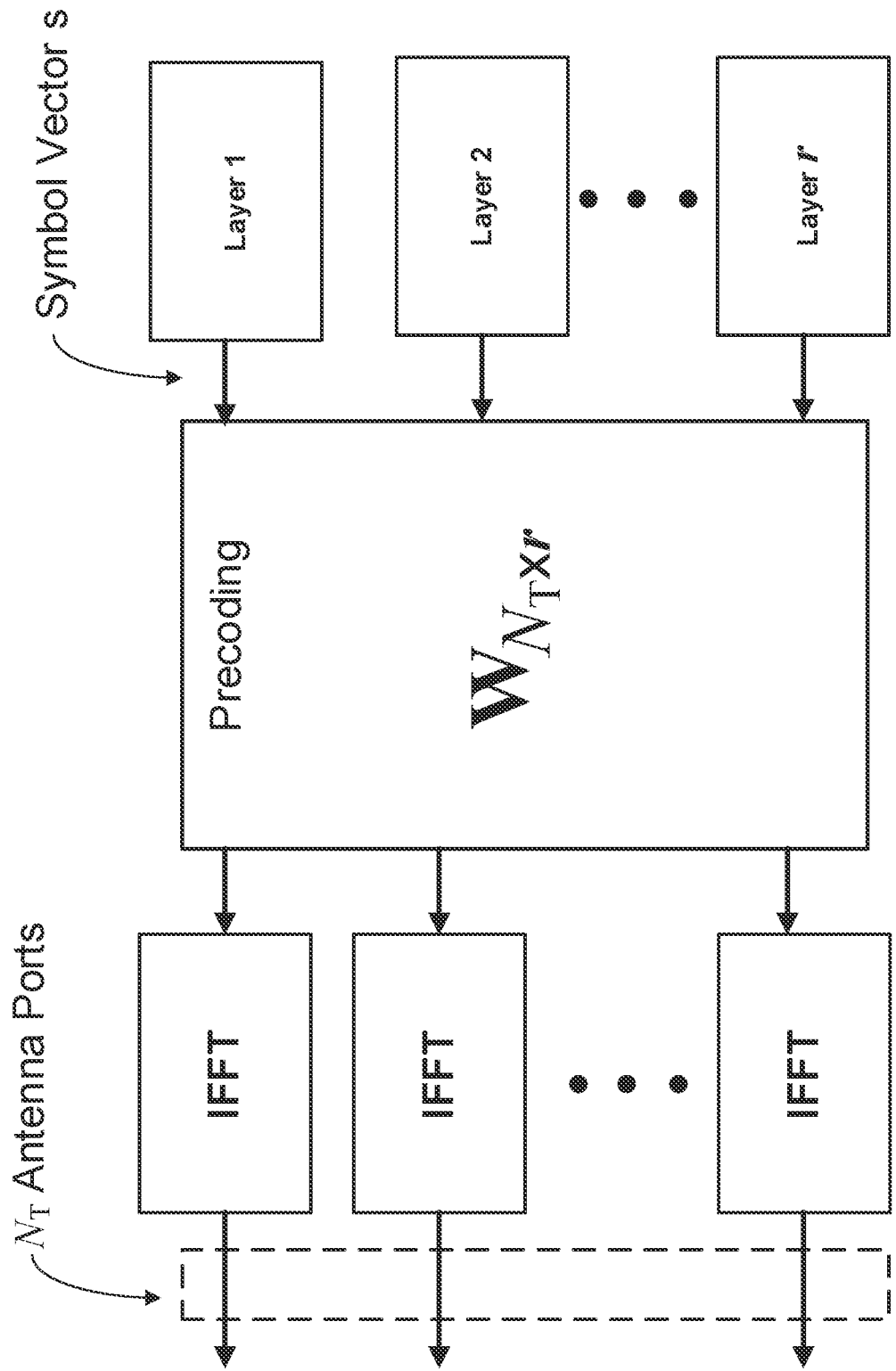
FIG. 1 is a block diagram illustrating spatial multiplexing operation.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. As used herein a UE is a wireless device (mobile or stationary) capable of wirelessly communicating with a network node (e.g. TRP). Examples of UEs include smartphones, sensors, appliances (or any other IoT device), laptop computers, tablets, etc. As used herein a network node may be a 5G or NR base station (e.g gNB, TRP) or an Long Term Evolution (LTE) base station (e.g. eNodeB/eNB) or any other suitable radio network node. Further examples are provided below.

As described above it is desirable to be able to configure a wireless device for either codebook based precoding or non-codebook based precoding, depending on the UE and/or network capabilities and/or system requirements. Codebook based and non-codebook based UL transmission typically benefit from different types of SRS transmissions; non-precoded SRS is preferred for codebook based and precoded SRS is preferred for non-codebook based.

For the UE to determine by itself the UL precoder candidates, it needs to measure a DL reference signal, such as a CSI-RS in order to attain a DL channel estimate. Based on this DL channel estimate, and assuming TX/RX reciprocity holds, the UE can convert the DL channel estimate into an UL channel estimate and use the UL channel estimate to determine a set of UL precoder candidates, for instance by performing a singular value decomposition (SVD) of the UL channel estimate or by other established precoder determination methods.

In some embodiments using non-codebook based precoding, a quasi co-location (QCL) indication to a certain CSI-RS resource is included, such that reciprocity based beamforming can be applied by the UE. This provides the benefit that the UE can determine the precoder based on the indicated QCL assumption.

The gNB may configure the UE, implicitly or explicitly, with which CSI-RS resource it can use to aid precoder candidate determination. In some proposals for NR, this is done by indicating that a certain CSI-RS resource is reciprocally spatially quasi co- located with the SRS resource(s) the UE is scheduled to use for UL sounding, for instance as a part of RRC configuration.

In some aspects and embodiments, a UE may be provided with a precoding indicator indicating that the UE should use a precoded SRS for the coming SRS transmissions, wherein the precoding indicator is in the form of, for example, a DL RS resource indicator (e.g., a RS resource ID (e.g., a CS-RS resource ID) or a TCI). In some embodiments, the DL RS resource indicator is included in an SRS transmission setting. In other embodiments, the DL RS resource indicator may be signalled to the UE (e.g., signalled using downlink control information (DCI)).

Accordingly, in some embodiments, a method for determining SRS transmission at a UE includes: 1) a TRP defines a set of SRS transmission settings, where some of the SRS transmission settings contain a DL RS resource indicator (e.g., a CSI-RS resource ID or a TCI); 2) a TRP triggers an aperiodic SRS transmission for a UE by signalling a DCI containing a pointer to an SRS transmission setting; 3) After receiving the DCI, the UE determines whether the SRS transmission setting to which the pointer points includes a DL RS resource indicator; and 4) As a result of determining that the SRS transmission setting includes a DL RS resource indicator, the UE uses the DL RS resource indicator to obtain a candidate precoding matrix (e.g., a beam forming vector), precodes an SRS using the candidate precoding matrix, and transmits the precoded SRS.

There are, proposed herein, various additional embodiments which also address one or more of the issues disclosed herein.

In some embodiments a network is enabled to perform quick dynamic switching between codebook based and non-codebook based UL transmissions in an efficient way, thereby improving network performance.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments disclosed herein means to enable dynamic switching between codebook-based and non-codebook-based UL transmission is provided. In some examples bundling together the indication of an SRS transmission with the indication of whether a DL RS resource can be used to aid the UE in deriving a precoding for the SRS. If an indication of a DL RS resource is not present, the UE may assume that the SRS shall be transmitted in a non-precoded manner and that the subsequent PUSCH transmission is performed using a codebook-based transmission mode. In some other embodiments, if an indication of a DL RS resource is present, the UE may assume that the UE can use said DL RS resource to derive one or more candidate precoding matrices for the SRS transmission and that the subsequent PUSCH transmission is performed using a non-codebook based transmission mode.

Figure 2:
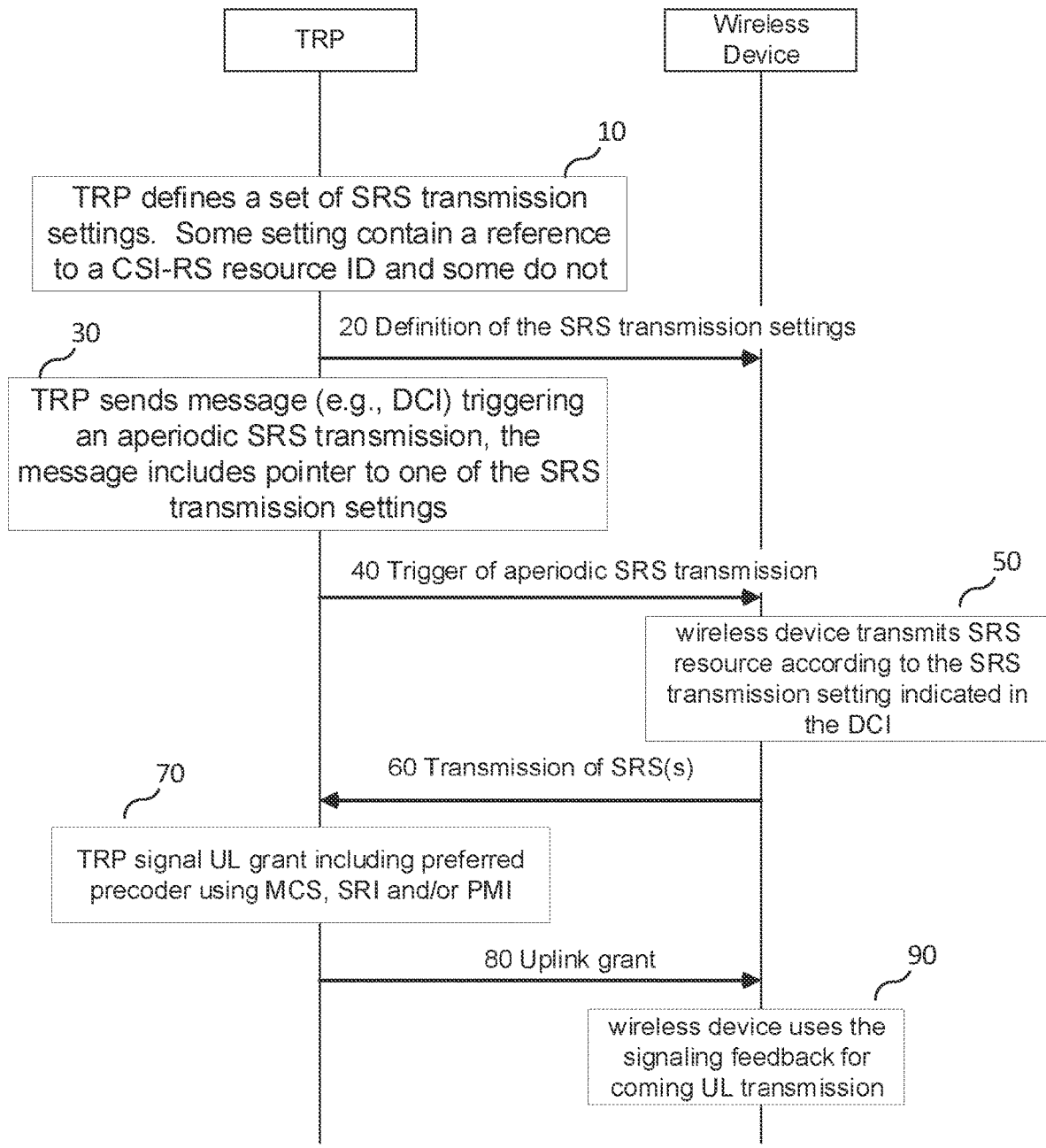
FIG. 2 is a sequence according to an embodiment of the present disclosure.

FIG. 2 is a message flow diagram illustrating an example message flow of an embodiment. In the first step, 10, the network node 200 (e.g. TRP) defines the different SRS transmission settings. Each SRS transmission settings can for example contain information about which SRS resources to use, which number of SRS ports per SRS resource to use etc. In some examples some SRS transmission settings contain a DL RS resource indicator (e.g., information about QCL information to a CSI-RS Id (or other reference signal Id)) and some do not. The DL RS resource indicator can be used by the wireless device 100 to find a DL RS resource on which to base reciprocity based UL precoding (typically used during non-codebook based UL transmissions). In step 20 the network node sends a message comprising the definition of the SRS transmission settings to the wireless device.

In the next step 30 the network node 200 configures a message for example, a DCI containing a pointer to one of the SRS transmission settings. The network node 200 then triggers an aperiodic SRS transmission by sending the message (e.g. DCI) to the wireless device at step 40. The wireless device 100 then determines the SRS transmissions according to the SRS transmission setting identified by the pointer in the message (e.g. DCI) at step 50. The wireless device 100 sends the SRS transmissions according to the transmission setting at step 60. The network node 200 then determines a preferred precoder based on the received SRS at step 70. The network node 200 signals an UL grant to the wireless device 100 indicating, how the wireless device should transmit UL data, including for example MCS, SRI and/or TPMI at step 80. The wireless device 100 then applies the received parameters and precoding information for the scheduled UL transmission at step 90.

A TRP can indicate a quasi co-location (QCL) assumption to an earlier transmitted DL reference signal (RS) (e.g. CSI-RS) that a UE may use when determining UL precoding.

SRS Transmission Setting

How the SRS transmission should be done, for example which SRS resource to use, the number of ports per SRS resource etc., needs to be signalled to the UE from the network node (e.g. TRP). One way to solve this (in a low overhead way) is to pre-define a set of SRS transmission settings using higher layer signalling (e.g. RRC signalling) of a SRS-Config IE and then indicate in DCI which SRS transmission setting that the UE should apply. An SRC-Config IE may comprise a plurality of SRS transmission setting IEs. Each SRS transmission setting IE may comprise: i) a single SRS resource set IE and ii) for each SRS resource set IE, each SRS resource IE identified in the SRS resource set IE. An SRS resource IE may contain, for example, information regarding which SRS ports that the UE should us in the coming SRS transmission.

An example description of such an information element as may be specified in 3GPP TS 38.331 "Radio Resource Control (RRC) Protocol Specification" for defining the SRS related parameters is given below:

TABLE 1

SRS-Config IE 2.1.1.1 SRS-Config
The SRS-Config IE is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).
SRS-Config information element
ASN1START
SRS configuration allowing to add and remove sets of SRS resources
SRS-Config ::=    SEQUENCE {
srs-ResourceSetToReleaseList   SEQUENCE (SIZE(0..maxNrofSRS-ResourceSets)
OF SRS-ResourceSetId OPTIONAL, -- Need ON
srs-ResourceSetToAddModList   SEQUENCE (SIZE(0..maxNrofSRS-
ResourceSets) OF SRS-ResourceSet OPTIONAL -- Need ON
srs-ResourceToReleaseList   SEQUENCE (SIZE(1..maxNrofSRS-Resources)) OF
SRS-ResourceId OPTIONAL, -- Need ON
srs-ResourceToAddModList   SEQUENCE (SIZE(1..maxNrofSRS-Resources))
OF SRS-Resource   OPTIONAL -- Need ON
Configuration of simultaneous SRS and PUCCH (see 38.214, section 6.2.1)
pucch-SRS-SimultaneousTransmission    BOOLEAN
}
A set of SRS resources
SRS-ResourceSet ::=    SEQUENCE {
srs-ResourceSetId   SRS-ResourceSetId
srs-ResourcesIds   SEQUENCE (SIZE(1..maxNrofSRS-ResourcesPerSet)) OF
SRS-ResourceId
The DCI "code point" upon which the UE shall transmit SRS according to this SRS
resource set configuration.
(see 38.214, section x.x.x.x)
aperiodicSRS-ResourceTrigger   TYPE_FFS!
}
SRS-ResourceSetId ::=   INTEGER (0..maxNrofSRS-ResourceSets-1)
SRS-Resource ::=   SEQUENCE {
srs-ResourceId   SRS-ResourceId,
nrofSRS-Ports   ENUMERATED {1port, 2ports, 4ports},
Comb value (2 or 4) and comb offset (see 38.214, section 6.2.1)
transmissionComb   ENUMERATED {n2, n4},
OFDM symbol location of the SRS resource within a slot including number of
OFDM symbols (1, 2, or 4 per SRS resource) (see 38.214, section 6.2.1)
resourceMapping   TYPE_FFS!,
Includes parameters capturing SRS frequency hopping (see 38.214, section 6.2.1)
freqHopping   TYPE_FFS!,
Time domain behavior of SRS resource configuration (see 38.214, section 6.2.1)
resourceType   TYPE_FFS!,
Periodicity and slot offset for periodic/semi-persistent SRS (see 38.214, section
6.2.1)
slotConfiguration   TYPE_FFS!,
Wideband and partial band SRS (see 38.214, section 6.2.1)
freqBand   TYPE_FFS!,
ADD DESCRIPTION (see 38.214, section 6.2.1)
sequenceId   TYPE_FFS!,
}
SRS-ResourceId ::= INTEGER (0..maxNrofSRS-Resources-1)

In this embodiment the RRC configuration of SRS transmission settings are performed with the IE SRS-Config, which contains a list of SRS-Resources (the list constitutes a "pool" of resources) wherein each SRS resource contains information of the physical mapping of the reference signal on the time-frequency grid, time-domain information, sequence IDs, etc. The SRS-Config also contains a list of SRS resource sets, which contains a list of SRS resources and an associated DCI trigger state. Thus, when a certain DCI state is triggered, it indicates that the SRS resources in the associated set shall be transmitted by the UE.

In some embodiments, the optional association of a DL RS resource (or "DL RS" for short) with an SRS transmission is achieved with an optional information element (IE) in an SRS-Config related IE (e.g., an SRS resource IE and/or an SRS resource set IE).

For instance, each SRS resource IE may contain an optional DL RS resource indicator IE containing a DL RS resource indicator (e.g., a spatial reciprocal QCL reference to a DL RS or a reference to a TCI, which includes a reference to a DL RS). If the DL RS is a CSI-RS, the reference may be to a CSI-RS-ResourceId as is indicated in the example SRS resource IE shown below in TABLE 2:

TABLE 2

SRS Resource IE

SRS-Resource ::= SEQUENCE {
srs-ResourceId SRS-ResourceId,
nrofSRS-Ports ENUMERATED {1port, 2ports, 4ports},
Comb value (2 or 4) and comb offset (see 38.214, section 6.2.1)
transmissionComb ENUMERATED {n2, n4},
OFDM symbol location of the SRS resource within a slot including number of
OFDM symbols (1, 2, or 4 per SRS resource) (see 38.214, section 6.2.1)
resourceMapping TYPE_FFS!,
Includes parameters capturing SRS frequency hopping (see 38.214, section 6.2.1)
freqHopping TYPE_FFS!,
Time domain behavior of SRS resource configuration (see 38.214, section 6.2.1)
resourceType TYPE_FFS!,
Periodicity and slot offset for periodic/semi-persistent SRS (see 38.214, section 6.2.1)
slotConfiguration TYPE_FFS!,
Wideband and partial band SRS (see 38.214, section 6.2.1)
freqBand TYPE_FFS!,
ADD DESCRIPTION (see 38.214, section 6.2.1)
sequenceId TYPE_FFS!,
qclReference-csi-rs-ResourceID CSI-RS-ResourceId OPTIONAL
}

In some examples, since the DL RS resource indicator IE is optional, it may or may not be present. Thus, if the IE is present and the SRS-Resource is triggered for transmission, the UE may utilize the indicated DL RS resource (e.g., CSI-RS Resource) to determine a precoding of the SRS (under the assumption that UL/DL reciprocity holds). In other embodiments, other types of DL RS s may be indicated, such as an ID of a Phase-Tracking Reference Signal (PTRS), Tracking Reference Signal (TRS) or Synchronization Signal Block (SSB).

A benefit of including the optional IE in the SRS Resource IE is that both non-precoded and precoded SRS Resources can be triggered simultaneously with the same DCI, implying that the gNB can dynamically select which of codebook-based and non-codebook based transmission shall be scheduled based on the quality of the transmitted SRS resources.

In other embodiments, the optional DL RS resource indicator IE is placed on a SRS resource set level, implying that all of the SRS Resources included in the SRS resource set are either precoded or non-precoded. An example of an SRS resource set IE is given below in TABLE 3:

TABLE 3

SRS Resource Set IE

SRS-ResourceSet ::= SEQUENCE {
srs-ResourceSetId SRS-ResourceSetId
srs-ResourcesIds SEQUENCE (SIZE(1..maxNrofSRS-ResourcesPerSet)) OF SRS-
ResourceId
The DCI "code point" upon which the UE shall transmit SRS according to this SRS
resource set configuration.
(see 38.214, section x.x.x.x)
aperiodicSRS-ResourceTrigger TYPE_FFS!
qclReference-csi-rs-ResourceID CSI-RS-ResourceId OPTIONAL
}

This approach may be more convenient since typically multiple SRS resources containing one antenna port each are transmitted in non-codebook based operation and it makes more sense to place the DL RS resource indicator on a SRS Resource set level. The gNB can still select between non-codebook and codebook-based transmission dynamically by triggering different SRS resource sets using different DCI states. For example, the gNB can select a non-codebook transmission by transmitting to the UE a DCI that identifies an SRS transmission setting that includes a DL RS resource indicator, and the gNB can select a codebook transmission by transmitting to the UE a DCI that identifies an SRS transmission setting that does not include any DL RS resource indicator.

In other embodiments, the DL RS resource indicator may be an indicator that contains references to one or more DL RS resource IDs. For example, the DL RE resource indicator may be a Transmission Configuration Indicator (TCI) that contains references to one or more DL RS resource IDs. However, the mapping between TCI and DL RS ID could be updated more dynamically, for instance using MAC CE or DCI signalling, rather than RRC. This implies that the association with SRS Transmission Setting and DL RS can be updated dynamically by updating the TCI to DL RS mapping using an auxiliary mechanism. An example of this embodiment is given by TABLE 4, below:

TABLE 4

SRS Resource Set IE

SRS-ResourceSet ::= SEQUENCE {
srs-ResourceSetId SRS-ResourceSetId
srs-ResourcesIds SEQUENCE (SIZE(1..maxNrofSRS-ResourcesPerSet)) OF SRS-ResourceId
The DCI "code point" upon which the UE shall transmit SRS according to this SRS resource set configuration.
(see 38.214, section x.x.x.x)
aperiodicSRS-ResourceTrigger TYPE_FFS!
qclReference-tci-State TCI OPTIONAL
}

Figure 3:
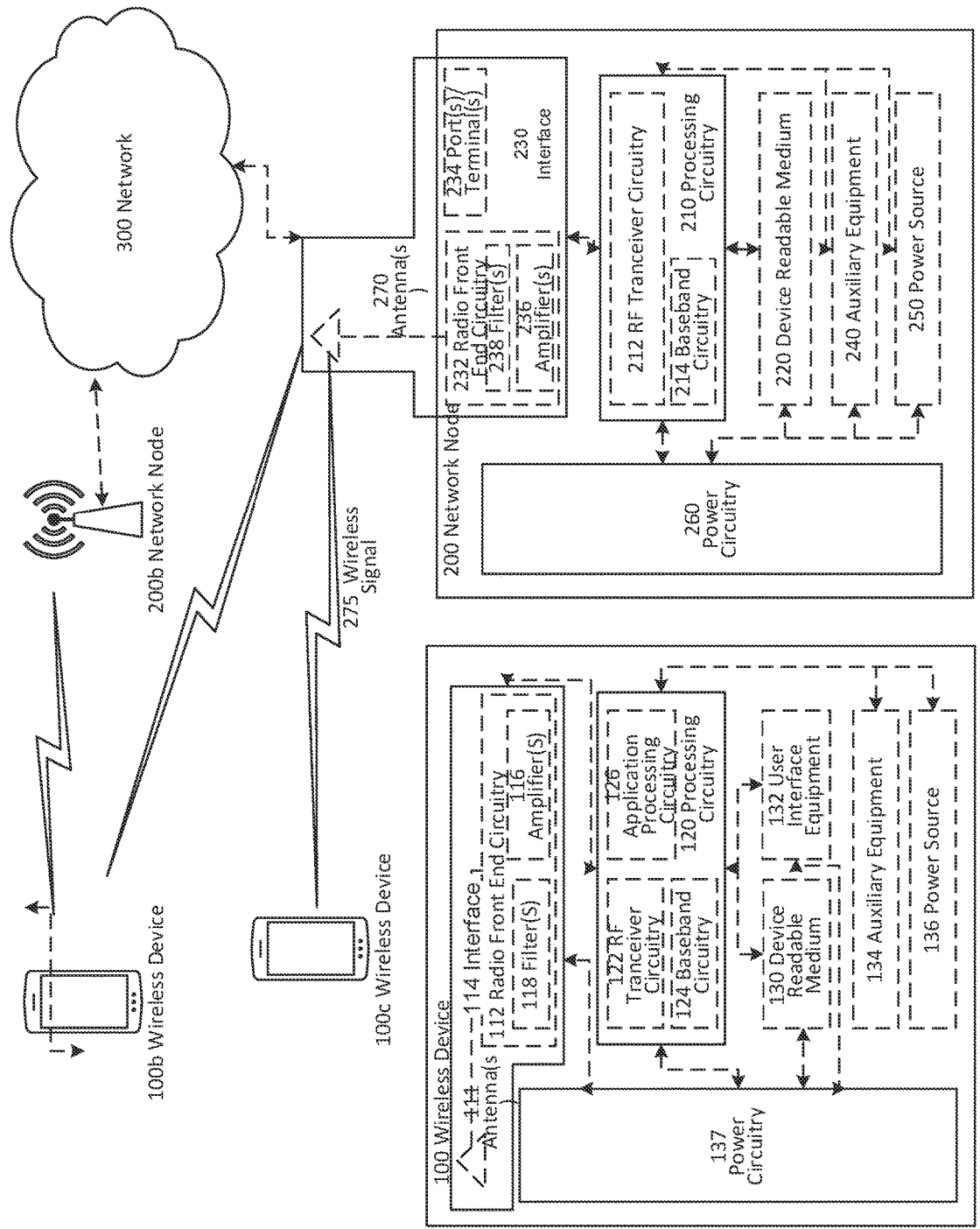
FIG. 3 is block diagram of nodes and devices according to one or more embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 300, network nodes 200 and 200*b*, referred to generally as 200 from her on, and wireless devices 100, 100*b*, and 100*c*, referred to generally as 100 from here on. In practice, a wireless network 300 may further include any additional elements suitable to support communication between wireless devices 100 or between a wireless device 100 and another communication device, such as a landline telephone, a service provider, or any other network node or end device. Of the illustrated components, network node 200 and wireless device (wireless device) 100 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 300 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 200 and wireless device 100 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 200 includes processing circuitry 210, device readable medium 220, interface 230, auxiliary equipment 240, power source 250, power circuitry 260, and antenna 270. Although network node 200 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 200 are depicted as single boxes located within a larger box, or nested within multiple boxes, in practice, a network node may comprise multiple different physical components that make up a single illustrated component (e.g., device readable medium 220 may comprise multiple separate hard drives as well as multiple RAM modules).

Similarly, network node 200 may be composed of multiple physically separate components (e.g., a NodeB component and a RNC component, or a BTS component and a BSC component, etc.), which may each have their own respective components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 200 may be configured to support multiple radio access technologies (RATs). In such embodiments, some components may be duplicated (e.g., separate device readable medium 220 for the different RATs) and some components may be reused (e.g., the same antenna 270 may be shared by the RATs). Network node 200 may also include multiple sets of the various illustrated components for different wireless technologies integrated into network node 200, such as, for example, GSM, WCDMA, LTE, NR, WiFi, or Bluetooth wireless technologies. These wireless technologies may be integrated into the same or different chip or set of chips and other components within network node 200.

Processing circuitry 210 is configured to perform any determining, calculating, or similar operations (e.g., certain obtaining operations) described herein as being provided by a network node. These operations performed by processing circuitry 210 may include processing information obtained by processing circuitry 210 by, for example, converting the obtained information into other information, comparing the obtained information or converted information to information stored in the network node, and/or performing one or more operations based on the obtained information or converted information, and as a result of said processing making a determination.

Processing circuitry 210 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 200 components, such as device readable medium 220, network node 200 functionality. For example, processing circuitry 210 may execute instructions stored in device readable medium 220 or in memory within processing circuitry 210. Such functionality may include providing any of the various wireless features, functions, or benefits discussed herein. In some embodiments, processing circuitry 210 may include a system on a chip (SOC).

In some embodiments, processing circuitry 210 may include one or more of radio frequency (RF) transceiver circuitry 212 and baseband processing circuitry 214. In some embodiments, radio frequency (RF) transceiver circuitry 212 and baseband processing circuitry 214 may be on separate chips (or sets of chips), boards, or units, such as radio units and digital units. In alternative embodiments, part or all of RF transceiver circuitry 212 and baseband processing circuitry 214 may be on the same chip or set of chips, boards, or units In certain embodiments, some or all of the functionality described herein as being provided by a network node, base station, eNB or other such network device may be performed by processing circuitry 210 executing instructions stored on device readable medium 220 or memory within processing circuitry 210. In alternative embodiments, some or all of the functionality may be provided by processing circuitry 210 without executing instructions stored on a separate or discrete device readable medium, such as in a hard-wired manner. In any of those embodiments, whether executing instructions stored on a device readable storage medium or not, processing circuitry 210 can be configured to perform the described functionality. The benefits provided by such functionality are not limited to processing circuitry 210 alone or to other components of network node 200, but are enjoyed by network node 200 as a whole, and/or by end users and the wireless network generally.

Device readable medium 220 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 210. Device readable medium 220 may store any suitable instructions, data or information, including a computer program, software, an application including one or more of logic, rules, code, tables, etc. and/or other instructions capable of being executed by processing circuitry 210 and, utilized by network node 200. Device readable medium 220 may be used to store any calculations made by processing circuitry 210 and/or any data received via interface 230. In some embodiments, processing circuitry 210 and device readable medium 220 may be considered to be integrated.

Interface 230 is used in the wired or wireless communication of signalling and/or data between network node 200, network 300, and/or wireless devices 100. As illustrated, interface 230 comprises port(s)/terminal(s) 234 to send and receive data, for example to and from network 300 over a wired connection. Interface 230 also includes radio front end circuitry 232 that may be coupled to, or in certain embodiments a part of, antenna 270. Radio front end circuitry 232 comprises filters 238 and amplifiers 236. Radio front end circuitry 232 may be connected to antenna 270 and processing circuitry 210. Radio front end circuitry may be configured to condition signals communicated between antenna 270 and processing circuitry 210. Radio front end circuitry 232 may receive digital data that is to be sent out to other network nodes or wireless devices via a wireless connection. Radio front end circuitry 232 may convert the digital data into a radio signal having the appropriate channel and bandwidth parameters using a combination of filters 238 and/or amplifiers 236. The radio signal may then be transmitted via antenna 270. Similarly, when receiving data, antenna 270 may collect radio signals which are then converted into digital data by radio front end circuitry 232. The digital data may be passed to processing circuitry 210. In other embodiments, the interface may comprise different components and/or different combinations of components.

In certain alternative embodiments, network node 200 may not include separate radio front end circuitry 232, instead, processing circuitry 210 may comprise radio front end circuitry and may be connected to antenna 270 without separate radio front end circuitry 232. Similarly, in some embodiments, all or some of RF transceiver circuitry 212 may be considered a part of interface 230. In still other embodiments, interface 230 may include one or more ports or terminals QQ194, radio front end circuitry 232, and RF transceiver circuitry 212, as part of a radio unit (not shown), and interface 230 may communicate with baseband processing circuitry 214, which is part of a digital unit (not shown).

Antenna 270 may include one or more antennas, or antenna arrays, configured to send and/or receive wireless signals 275. Antenna 270 may be coupled to radio front end circuitry 230 and may be any type of antenna capable of transmitting and receiving data and/or signals wirelessly. In some embodiments, antenna 270 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 270 may be separate from network node 200 and may be connectable to network node 200 through an interface or port.

Antenna 270, interface 230, and/or processing circuitry 210 may be configured to perform any receiving operations and/or certain obtaining operations described herein as being performed by a network node. Any information, data and/or signals may be received from a wireless device, another network node and/or any other network equipment. Similarly, antenna 270, interface 230, and/or processing circuitry 210 may be configured to perform any transmitting operations described herein as being performed by a network node. Any information, data and/or signals may be transmitted to a wireless device, another network node and/or any other network equipment.

Power circuitry 260 may comprise, or be coupled to, power management circuitry and is configured to supply the components of network node 200 with power for performing the functionality described herein. Power circuitry 260 may receive power from power source 250. Power source 250 and/or power circuitry 260 may be configured to provide power to the various components of network node 200 in a form suitable for the respective components (e.g., at a voltage and current level needed for each respective component). Power source 250 may either be included in, or external to, power circuitry 260 and/or network node 200. For example, network node 200 may be connectable to an external power source (e.g., an electricity outlet) via an input circuitry or interface such as an electrical cable, whereby the external power source supplies power to power circuitry 260. As a further example, power source 250 may comprise a source of power in the form of a battery or battery pack which is connected to, or integrated in, power circuitry 260. The battery may provide backup power should the external power source fail. Other types of power sources, such as photovoltaic devices, may also be used.

Alternative embodiments of network node 200 may include additional components beyond those shown in FIG. 3 that may be responsible for providing certain aspects of the network node's functionality, including any of the functionality described herein and/or any functionality necessary to support the subject matter described herein. For example, network node 200 may include user interface equipment to allow input of information into network node 200 and to allow output of information from network node 200. This may allow a user to perform diagnostic, maintenance, repair, and other administrative functions for network node 200.

As used herein, wireless device (wireless device) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals 275 using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 100 includes antenna 111, interface 114, processing circuitry 120, device readable medium 130, user interface equipment 132, auxiliary equipment 134, power source 136 and power circuitry 137. wireless device 100 may include multiple sets of one or more of the illustrated components for different wireless technologies supported by wireless device 100, such as, for example, GSM, WCDMA, LTE, NR, WiFi, WiMAX, or Bluetooth wireless technologies, just to mention a few. These wireless technologies may be integrated into the same or different chips or set of chips as other components within wireless device 100.

Antenna 111 may include one or more antennas or antenna arrays, configured to send and/or receive wireless signals 275, and is connected to interface 114. In certain alternative embodiments, antenna 111 may be separate from wireless device 100 and be connectable to wireless device 100 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 100 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 100 components, such as device readable medium 130, wireless device 100 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 100 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 100, but are enjoyed by wireless device 100 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 100, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 100. Such interaction may be of many forms, such as visual, audial, tactile, etc. User interface equipment 132 may be operable to produce output to the user and to allow the user to provide input to wireless device 100. The type of interaction may vary depending on the type of user interface equipment 132 installed in wireless device 100. For example, if wireless device 100 is a smart phone, the interaction may be via a touch screen; if wireless device 100 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 100, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 100, and to allow processing circuitry 120 to output information from wireless device 100. User interface equipment 132 may include, for example, a speaker, a display, vibrating circuitry, a USB port, a headphone interface, or other output circuitry. Using one or more input and output interfaces, devices, and circuits, of user interface equipment 132, wireless device 100 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 100 may further comprise power circuitry 137 for delivering power from power source 136 to the various parts of wireless device 100 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 100 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 100 to which power is supplied.

With reference to the wireless 100 of FIG. 3, according to an embodiment, the wireless device is configured to receive a definition of one or more SRS resource sets to be configured, comprising at least one SRS transmission setting. The wireless device is further configured to receive an indication of a selected SRS resource set from the one or more configured SRS resource sets to use for a SRS transmission. The wireless device is further configured to determine a precoding configuration for the SRS transmission based on the selected SRS resource set and the at least one SRS transmission setting. The wireless device is further configured to transmit a SRS according to the determined precoding configuration. In some aspects wireless device is configured such that the determined precoding configuration for the SRS transmission comprises one of codebook based precoding or non-codebook based precoding. In some examples the precoding configuration for the SRS transmission is determined based on a precoding indicator. The precoding indicator may be comprised in the at least one SRS transmission setting. The precoding indicator may be a downlink reference signal, DL RS, identifier which identifies an associated DL RS. The determined precoding configuration for the SRS transmission may comprise applying reciprocity-based precoding for the SRS transmission. The selected SRS resource may comprises an association to a DL RS and the wireless device is further configured to determine a reciprocity-based precoder for the SRS transmission based on the associated DL RS. The SRS transmission may be an aperiodic transmission and the indication of a selected SRS resource set may comprise a DL control information (DCI) indicator.

With reference to the network node 200 of FIG. 3, according to an embodiment, the network node is configured to send, to a wireless device, a definition of one or more SRS resource sets to be configured, comprising at least one SRS transmission setting. The network node is further configured to send an indication of a selected SRS resource set from the one or more configured SRS resource sets to use for a SRS transmission, wherein the at least one SRS transmission setting corresponds to a precoding configuration for the SRS transmission. The network node is further configured to receive a SRS transmission according to the corresponding precoding configuration. In some examples the corresponding precoding configuration for the SRS transmission comprises one of codebook based precoding or non-codebook based precoding. The selected resource set may comprises a precoding indicator. In some examples the precoding indicator is comprised in the at least one SRS transmission setting. The precoding indicator may be a downlink reference signal, DL RS, identifier which identifies an associated DL RS. The corresponding precoding configuration for the SRS transmission may comprise reciprocity-based precoding for the SRS transmission. The selected SRS resource may comprise an association to a DL RS and the corresponding precoding configuration comprises reciprocity-based precoding based on the associated DL RS. In some examples the SRS transmission is an aperiodic transmission and the indication of a selected SRS resource set comprises a DL control information (DCI) indicator. In other examples the SRS transmission is periodic or semi-persistent.

According to another embodiment the network node 200 is a base station apparatus comprising processor circuitry 210, memory in the form of device readable medium 220 and transceiver circuitry 212. The transceiver circuitry is configured to send, to a wireless device, an indication of one or more SRS resource sets to be configured, comprising at least one SRS transmission setting. The transceiver circuitry is further configured to send an indication of a selected SRS resource set from the one or more configured SRS resource sets to use for a SRS transmission, wherein the at least one SRS transmission setting corresponds to a precoding configuration for the SRS transmission. The transceiver circuitry is further configured to receive a SRS transmission according to the corresponding precoding configuration.

Figure 4:
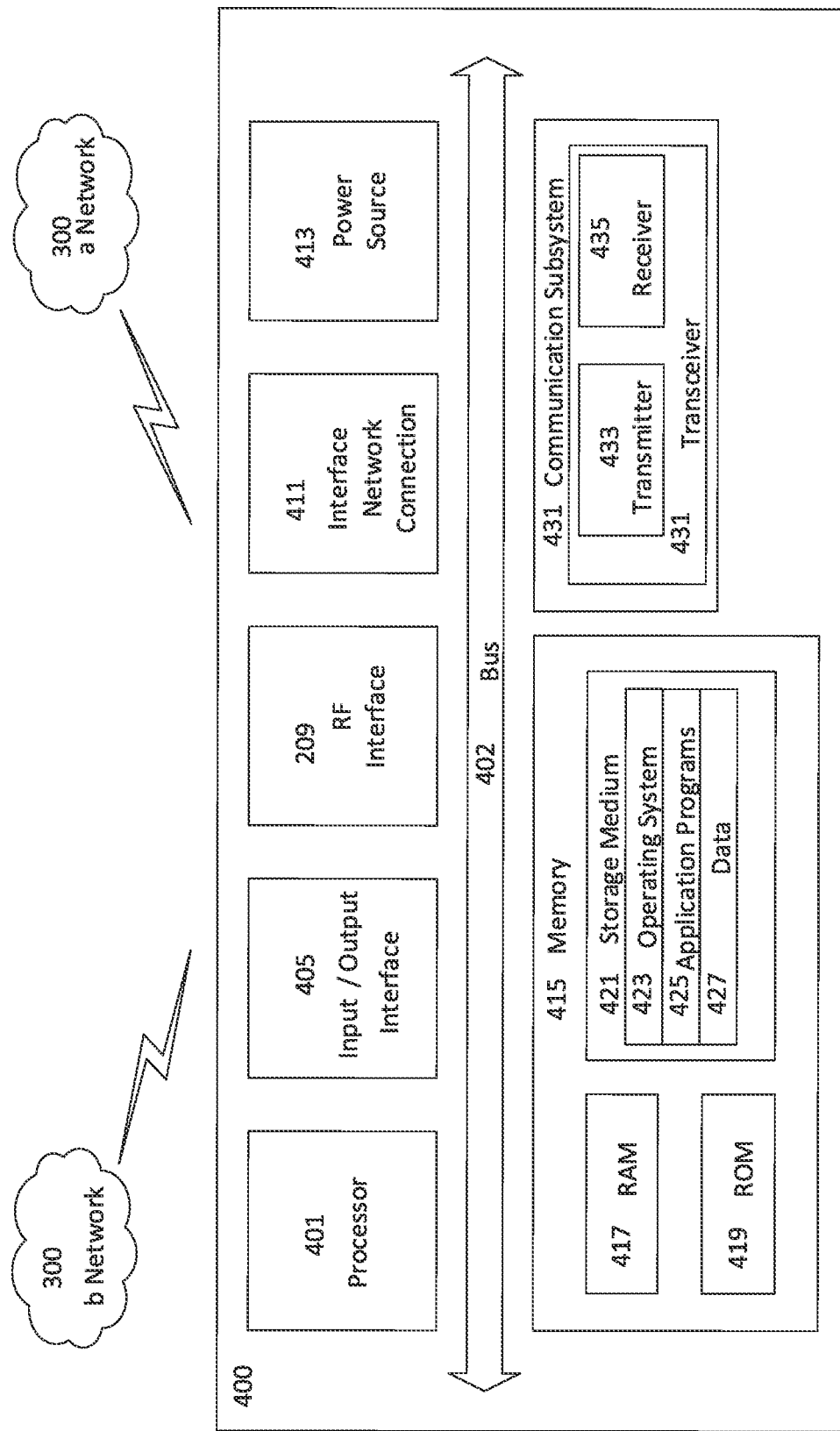
FIG. 4 is block diagram of a user equipment according to one or more embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 4 is a UE, the components discussed herein are equally applicable to a wireless device, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 300*a*. Network 300*a* may encompass wired and/or wireless networks such as a local-area network (LAN), a wide-area network (WAN), a computer network, a wireless network, a telecommunications network, another like network or any combination thereof. For example, network 300*a* may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 300*b* using communication subsystem 431. Network 300*a* and network 300*b* may be the same network or networks or different network or networks. Communication subsystem 431 may be configured to include one or more transceivers used to communicate with network 300*b*. For example, communication subsystem 431 may be configured to include one or more transceivers 431 used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver 431 may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 300*b* may encompass wired and/or wireless networks such as a local-area network (LAN), a wide-area network (WAN), a computer network, a wireless network, a telecommunications network, another like network or any combination thereof. For example, network 300*b* may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

With reference to the UE of FIG. 4, an example embodiment is presented wherein the UE apparatus 400 comprises processor circuitry 401, memory 415 and a transceiver 431. In some examples the transceiver 431 configured to receive a definition of one or more SRS resource sets to be configured, comprising at least one SRS transmission setting. The transceiver 431 may be further configured to receive an indication of a selected SRS resource set from the one or more configured SRS resource sets to use for a SRS transmission. In the example, the processing circuitry 401 is configured to determine a precoding configuration for the SRS transmission based on the selected SRS resource set and the at least one SRS transmission setting. The transceiver 431 is further configured to transmit a SRS according to the determined precoding configuration.

Figure 5:
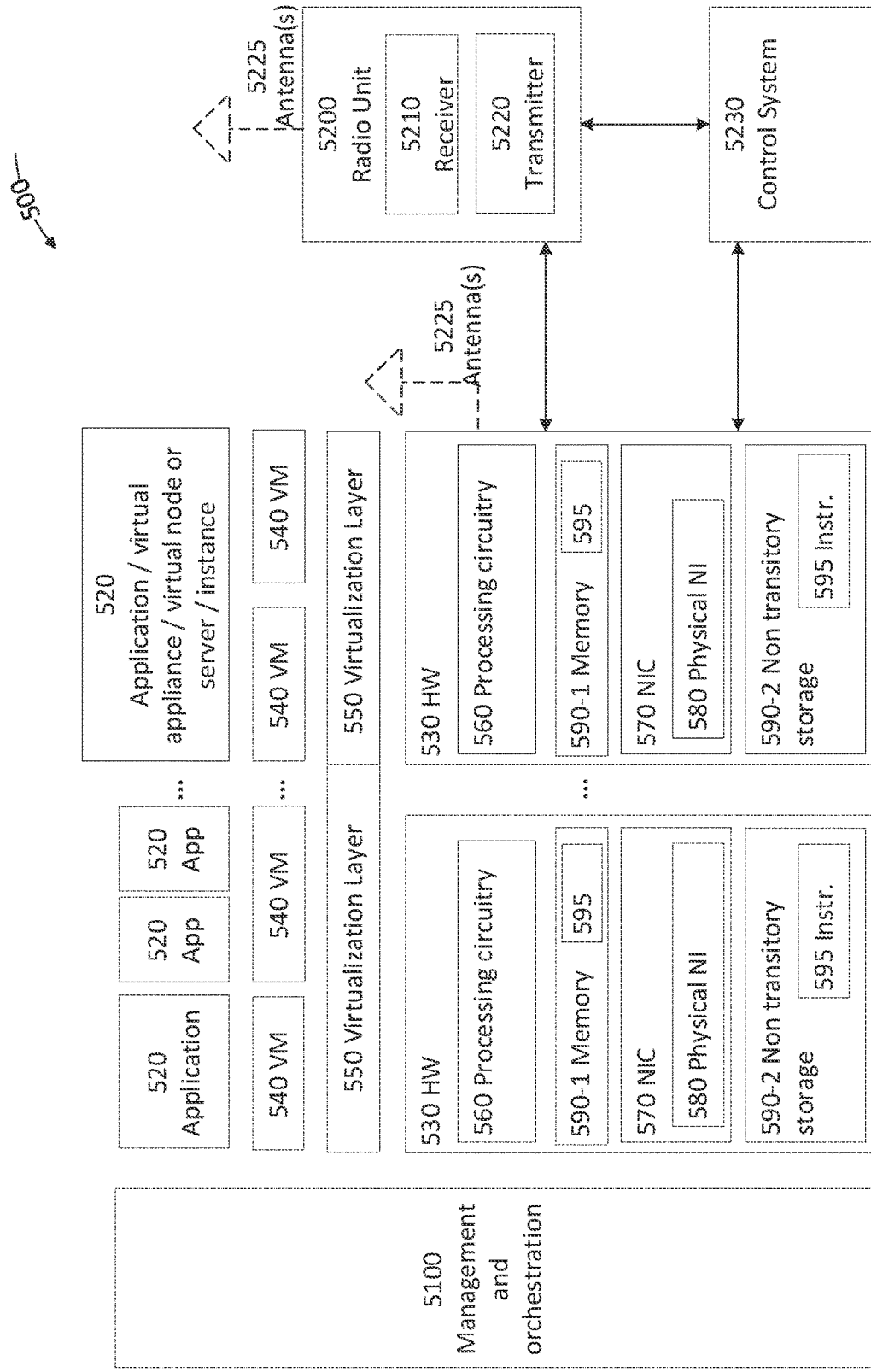
FIG. 5 is an example virtualization environment in accordance with some embodiments.

FIG. 5 is a schematic block diagram illustrating a virtualization environment 5500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
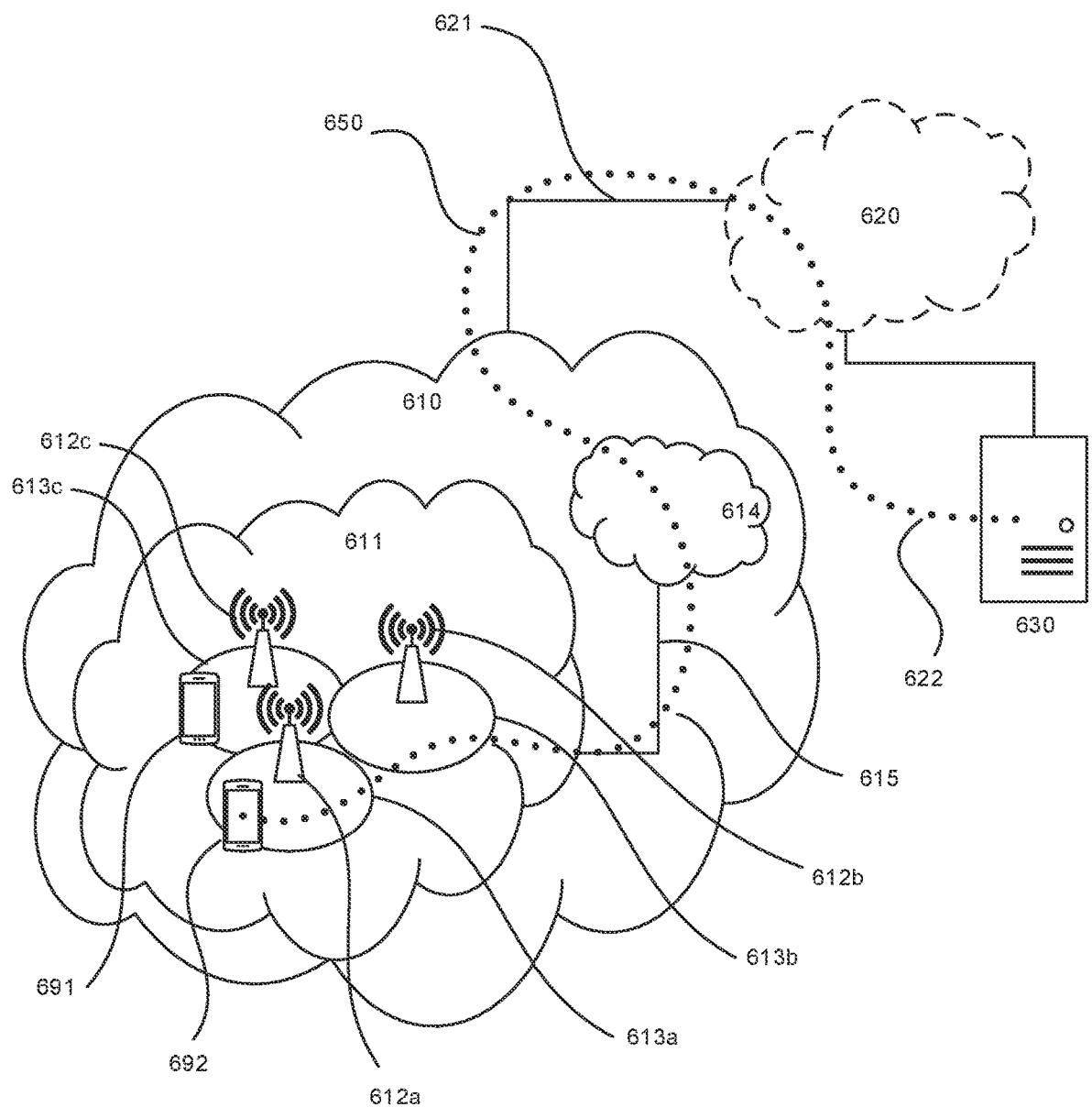
FIG. 6 is an example telecommunication network connected via an intermediate network to a host computer in accordance with some embodiments.

FIG. 6 illustrates a telecommunication network connected via an intermediate network to a host computer in accordance with some embodiments. With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7, which illustrates a host computer communicating via a base station with a user equipment over a partially wireless connection in accordance with some embodiments. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
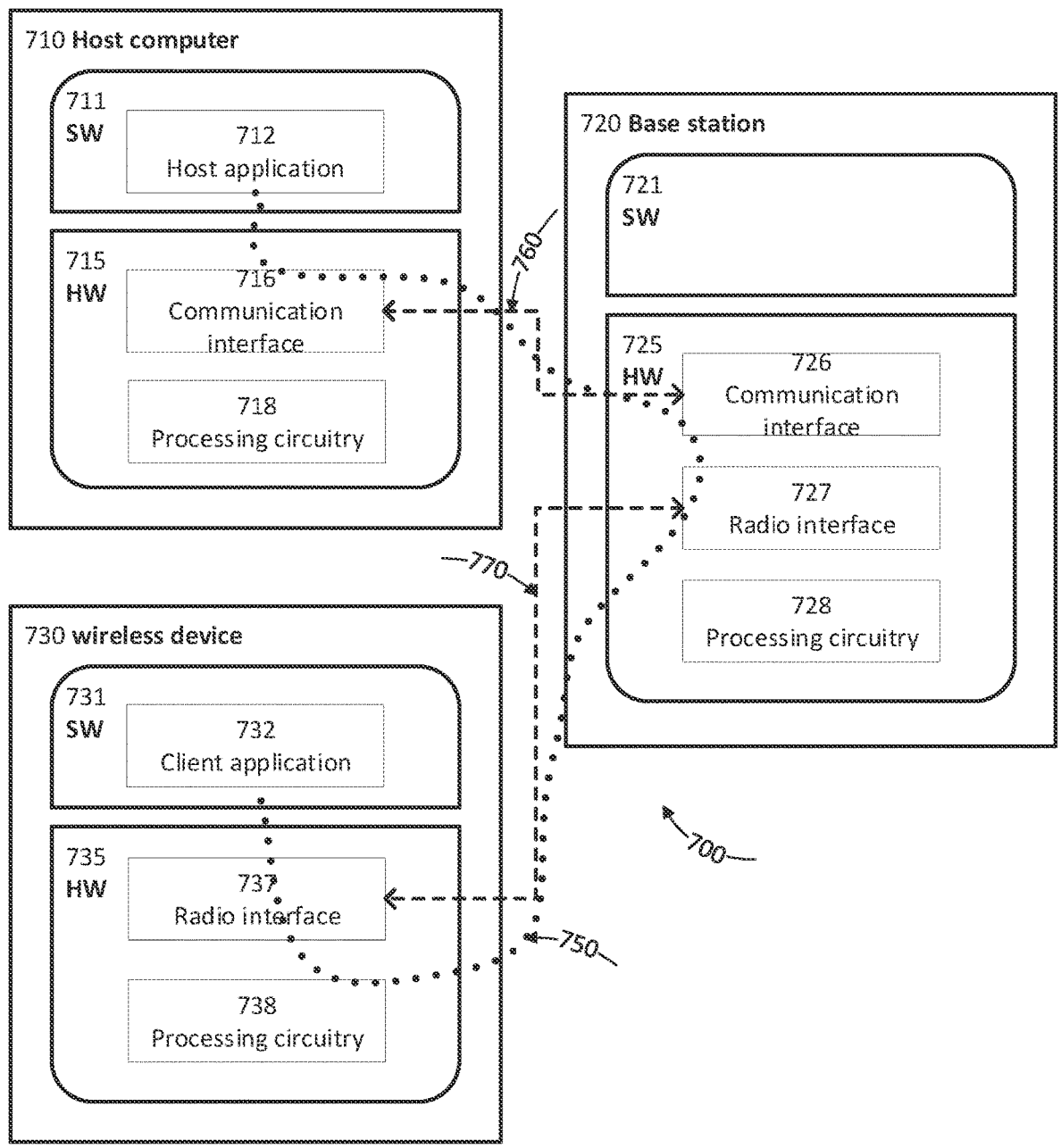
FIG. 7 is an example host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
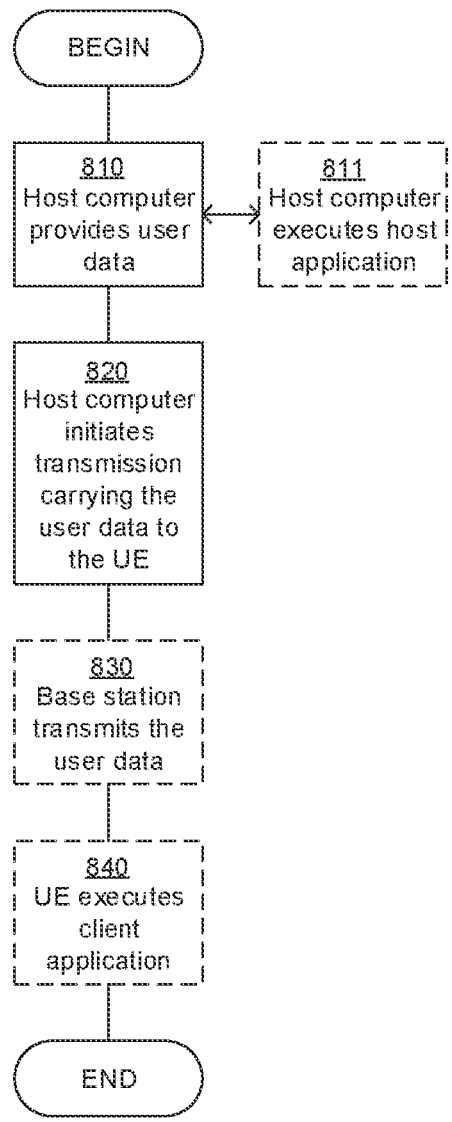
FIG. 8 is an example flow chart performed by a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
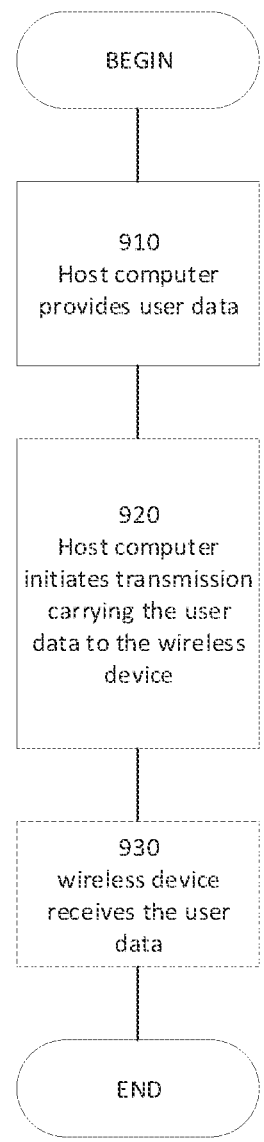
FIG. 9 is an example flow chart performed by a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
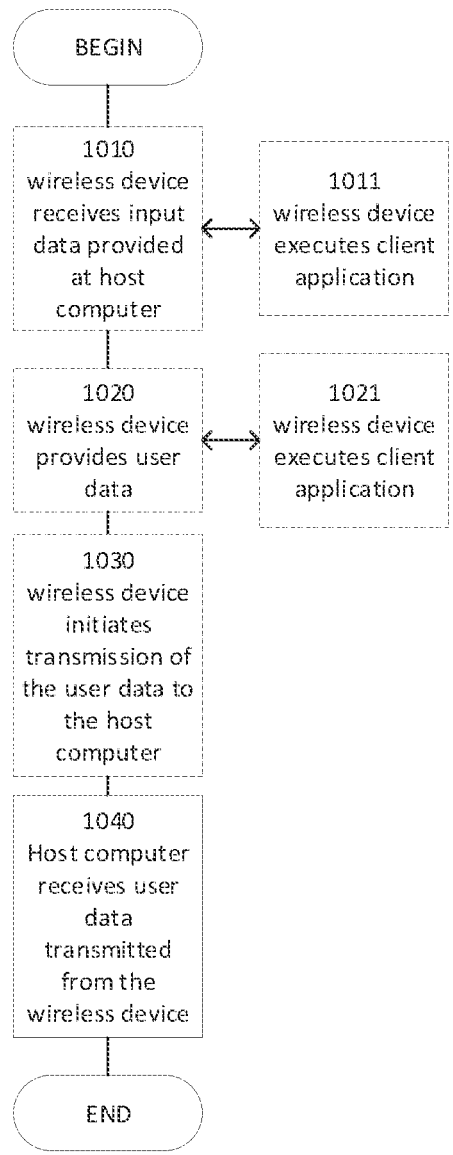
FIG. 10 is an example flow chart performed by a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
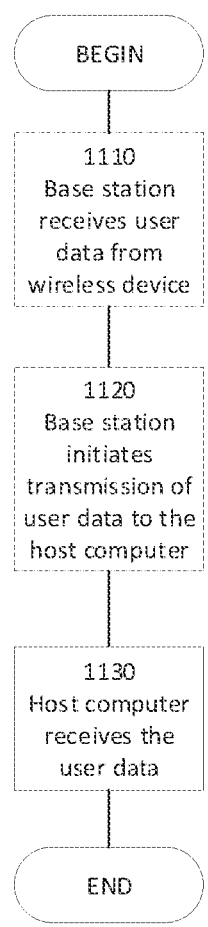
FIG. 11 is an example flow chart performed by a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
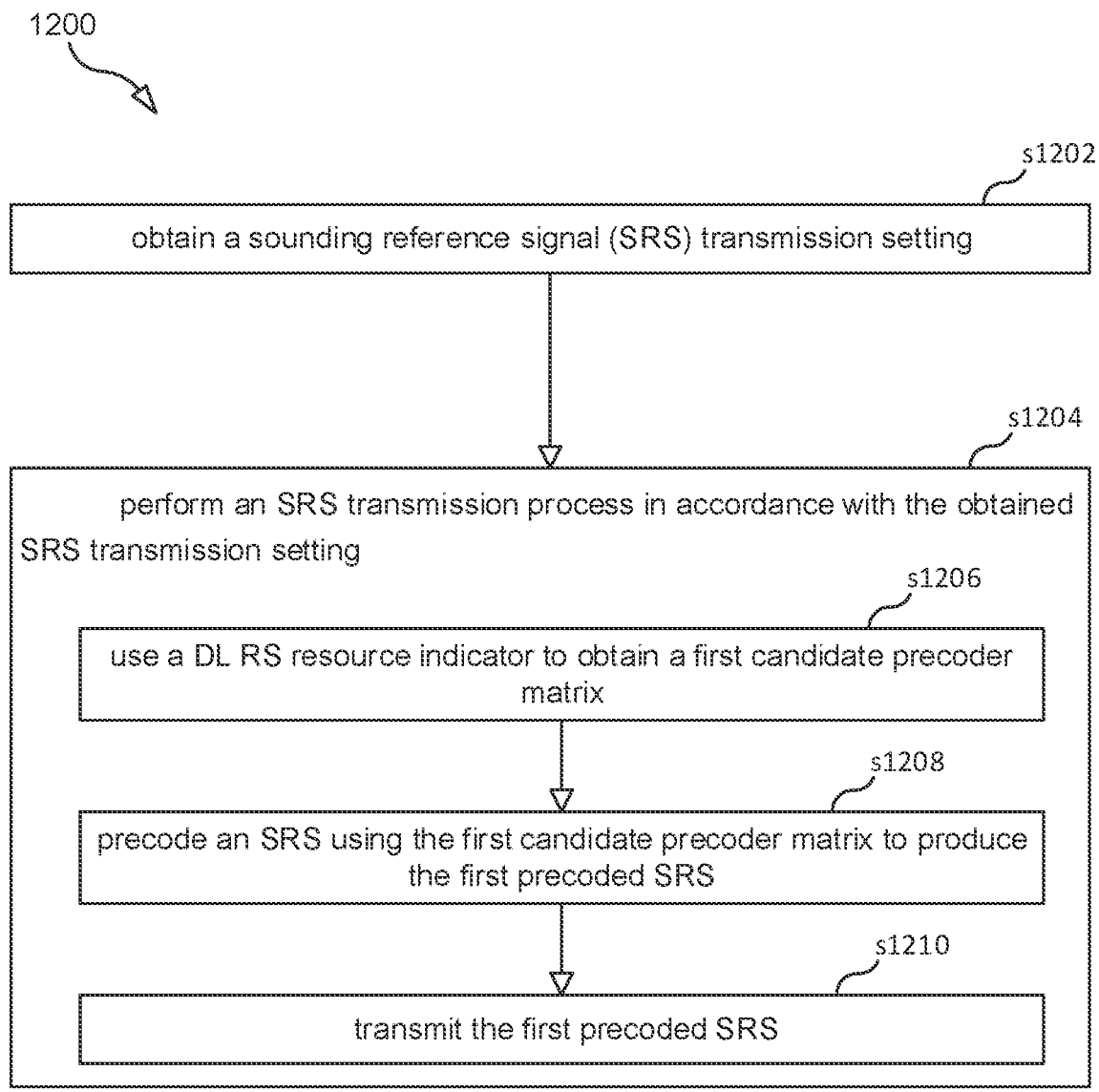
FIG. 12 is an example flow chart in accordance with some embodiments.

FIG. 12 is a flow chart illustrating a method 1200 in accordance with particular embodiments. The method may begin at step s1202 in which a wireless device obtains a sounding reference signal (SRS) transmission setting. In step s1204, the wireless device performs an SRS transmission process in accordance with the obtained SRS transmission setting, wherein performing the SRS transmission process comprises: the wireless device using a DL RS resource indicator to obtain a first candidate precoder matrix (step s1206); the wireless device precoding an SRS using the first candidate precoder matrix to produce the first precoded SRS (step s1208); and the wireless device transmitting the first precoded SRS (step s1210).

Figure 13:
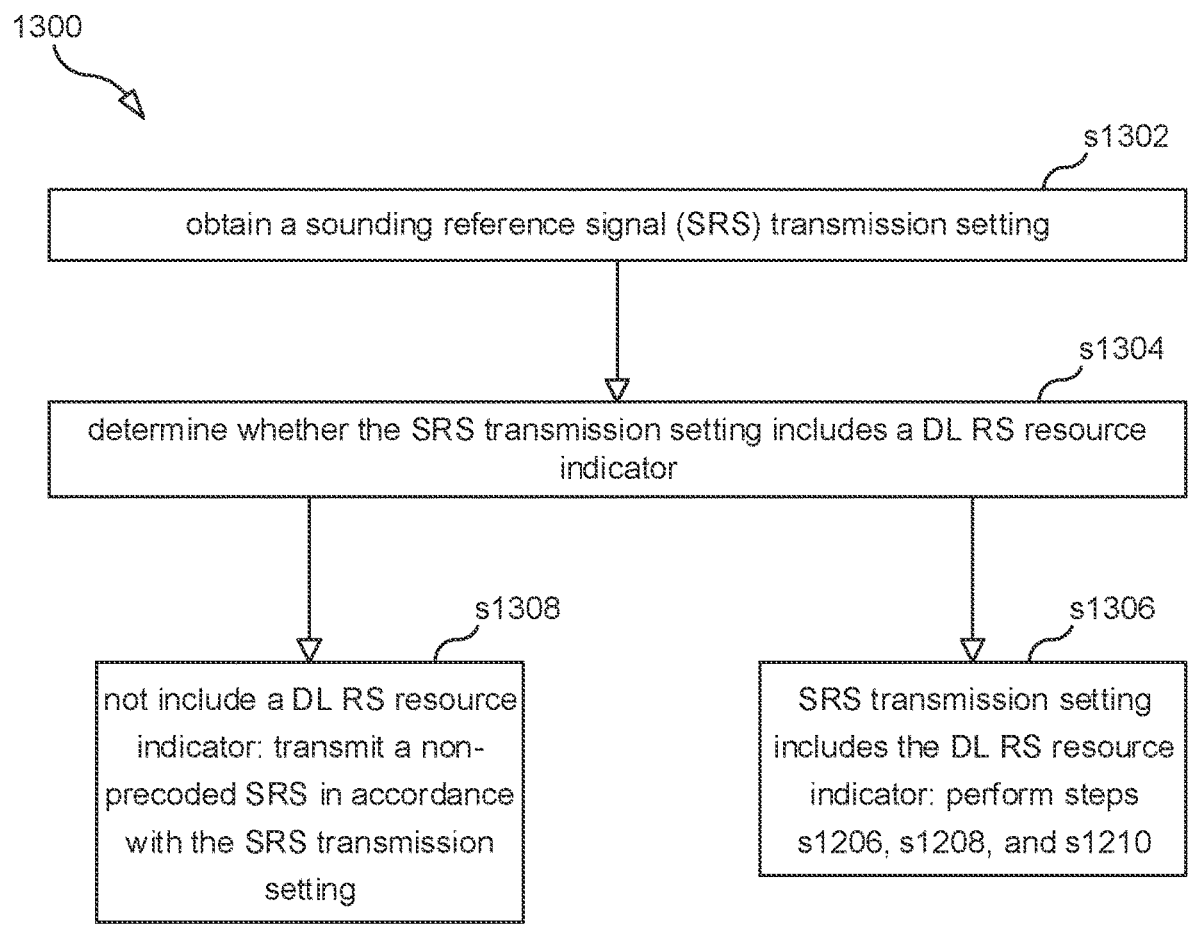
FIG. 13 is an example flow chart in accordance with some embodiments.

FIG. 13 is a flow chart illustrating a method 1300 in accordance with particular embodiments. The method may begin at step s1302 in which a wireless device obtains an SRS transmission setting. In step s1304, the wireless device determines whether the SRS transmission setting includes a DL RS resource indicator. In step s1306, which is performed as a result of the wireless device determining that the SRS transmission setting includes the DL RS resource indicator, the wireless device performs the SRS transmission process (e.g., steps s1206, s1208, and s1210). In step s1308, which is performed as a result of the wireless device determining that the SRS transmission setting does not include a DL RS resource indicator, the wireless device transmits a non-precoded SRS in accordance with the SRS transmission setting.

Figure 14:
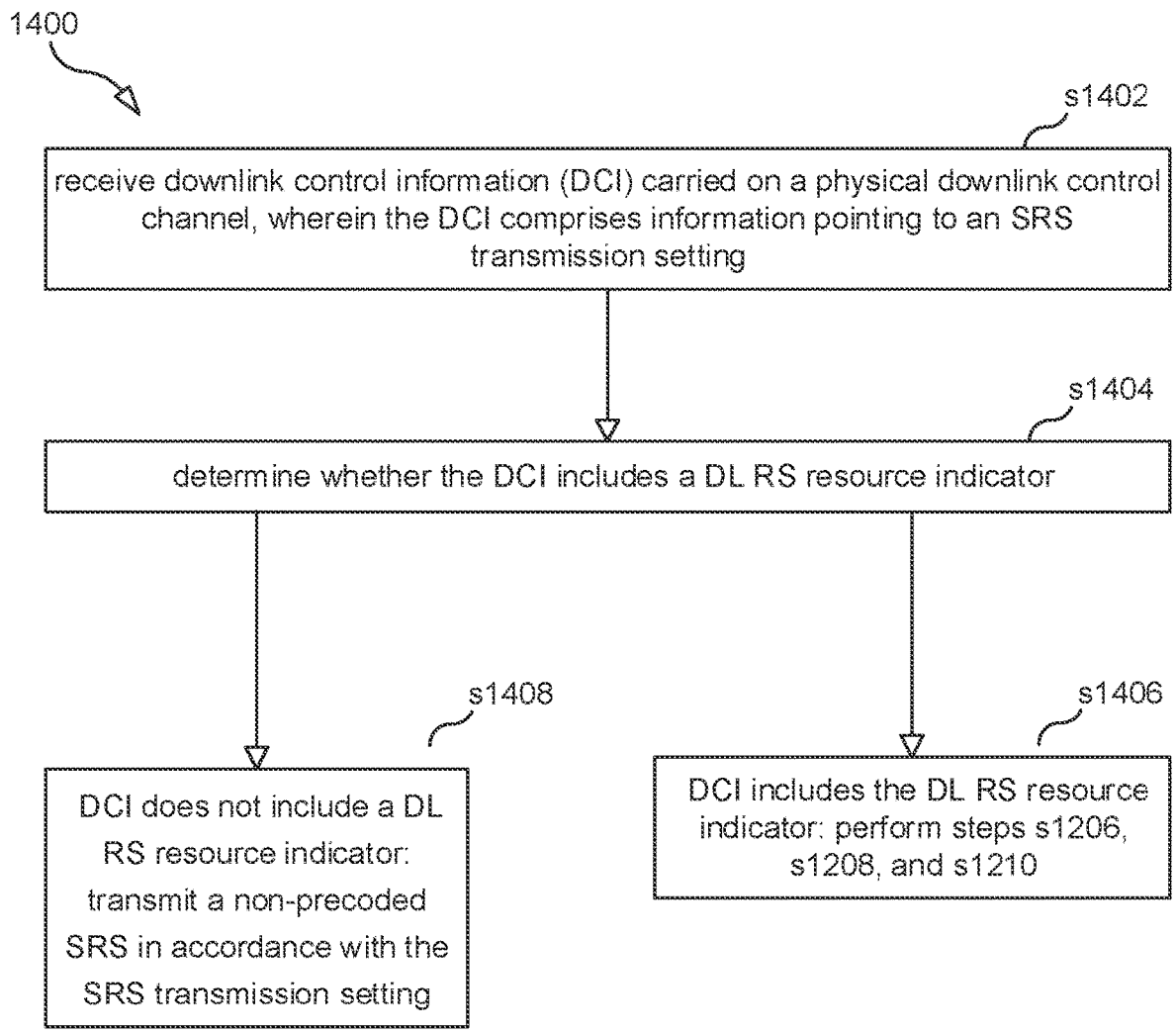
FIG. 14 is an example flow chart in accordance with some embodiments.

FIG. 14 is a flow chart illustrating a method 1400 in accordance with particular embodiments. The method may begin at step s1402 in which a wireless device receives downlink control information (DCI) carried on a physical downlink control channel, wherein the DCI comprises information pointing to an SRS transmission setting. In step s1404, the wireless device determines whether the DCI includes a DL RS resource indicator. In step s1406, which is performed as a result of the wireless device determining that the DCI includes the DL RS resource indicator, the wireless device performs the SRS transmission process (e.g., steps s1206, s1208, and s1210). In step s1408, which is performed as a result of the wireless device determining that the DCI does not include a DL RS resource indicator, the UE transmits a non-precoded SRS in accordance with the SRS transmission setting.

In some embodiments, the SRS transmission setting comprises an SRS resource set information element (IE), the SRS resource set IE comprises information identifying a set of one or more SRS resource IEs (e.g., a list of SRS resource IDs), and the SRS resource set IE further comprises the DL RS resource indicator.

In some embodiments, the SRS transmission setting comprises an SRS resource IE, and the SRS resource IE comprises the DL RS resource indicator. In such an embodiments, the SRS transmission setting may further comprise an SRS resource set information element (IE) and the SRS resource set IE comprises information identifying a set of one or more SRS resource IEs.

In some embodiments, the SRS transmission process further comprises: the wireless device using the DL RS resource indicator to obtain a second candidate precoder matrix; the UE precoding an SRS using the second candidate precoder matrix to produce a second precoded SRS; and the UE transmitting the second precoded SRS.

In some embodiments, methods 1200 and/or 1300 further include: the wireless device receiving downlink control information (DCI) carried on a physical downlink control channel, wherein the DCI comprises information pointing to the SRS transmission setting. The wireless device then obtains the SRS transmission setting in response to receiving the DCI, wherein the wireless device may obtain the SRS transmission setting by retrieving it from a storage unit internal to the wireless device. In some embodiments, the DCI includes the DL RE resource indicator.

In some embodiments, the DL RS resource indicator is one of: an RS resource identifier (ID) (e.g., a CSI-RS resource ID), and an indicator (e.g., TCI) that comprises one more RS resource IDs.

In some embodiments, the wireless device stores a set of one or more candidate precoder matrices, wherein the set of candidate precoder matrices is associated with the DL RS resource indicator, the wireless device uses the DL RS resource indicator to identify the set of candidate precoder matrices and selects the first candidate precoder matrix from the set of candidate precoder matrices.

In some embodiments, the DL RS resource indicator points to a previously transmitted DL RS, and the UE uses the DL RS resource indicator to obtain the first candidate precoder matrix by performing a measurement with respect to the DL RS and determining the first candidate precoder matrix based on this measurement.

In some embodiments, the DL RS resource indicator points to a DL RS that will be transmitted to the UE, and the UE uses the DL RS resource indicator to obtain the first candidate precoder matrix by receiving the DL RS, performing a measurement with respect to the received DL RS, and determining the first candidate precoder matrix based on this measurement.

Figure 15:
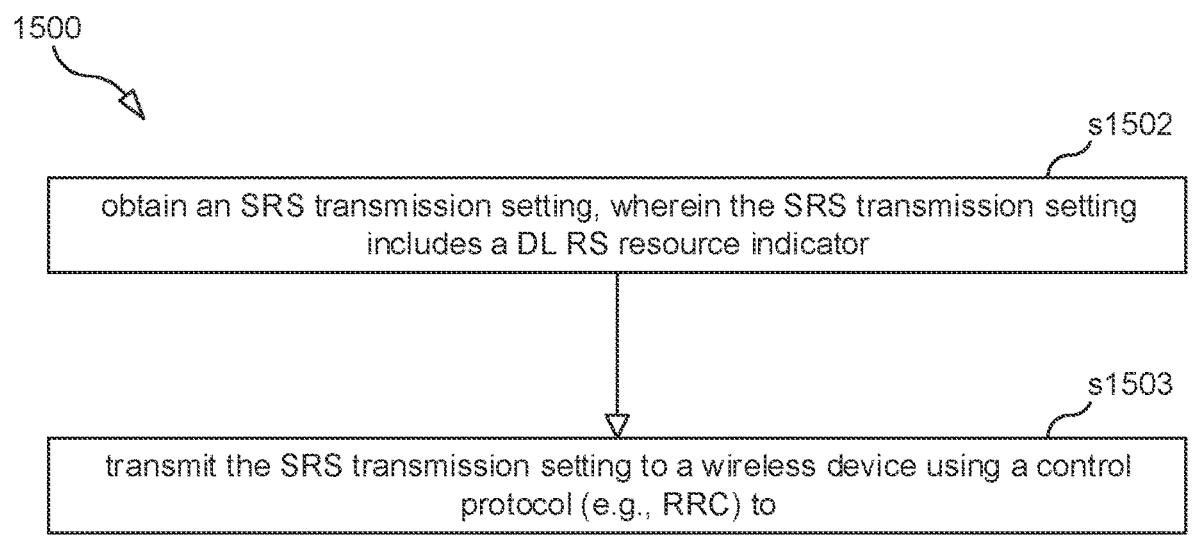
FIG. 15 is an example flow chart in accordance with some embodiments.

FIG. 15 is a flow chart illustrating a method 1500 in accordance with particular embodiments. The method may begin at step s1502 in which a network node (e.g. a TRP) obtains an SRS transmission setting, wherein the SRS transmission setting includes a DL RS resource indicator. And in step s1504, the network node uses a control protocol (e.g., RRC) to transmit the SRS transmission setting to a UE.

Figure 16:
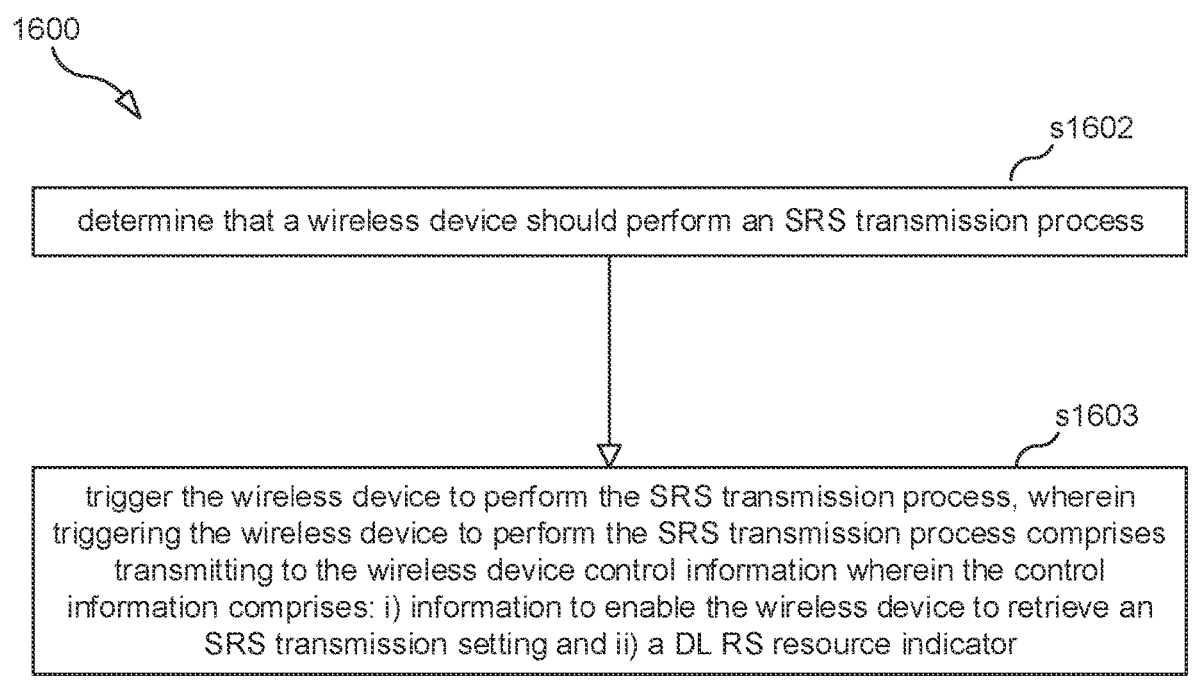
FIG. 16 is an example flow chart in accordance with some embodiments.

FIG. 16 is a flow chart illustrating a method 1600 in accordance with particular embodiments. The method may begin at step s1602 in which a TRP determines that a UE should perform an SRS transmission process. And in step s1604, as a result of determining that a UE should perform the SRS transmission process, the TRP triggers the UE to perform the SRS transmission process, wherein triggering the UE to perform the SRS transmission process comprises transmitting to the UE control information (e.g., Down Link Control Information (DCI)), wherein the control information comprises: i) information to enable the UE to retrieve an SRS transmission setting and ii) a DL RS resource indicator.

In some embodiments, method 1600 further includes: after transmitting the control information, receiving from the UE a precoded SRS and a non-precoded SRS; after receiving the precoded SRS and the non-precoded SRS, determining, based on the received precoded SRS and the received non-precoded SRS, whether the UE should perform a codebook-based UL transmission or a non-codebook-based UL transmission; and after determining whether the UE should perform a codebook-based UL transmission or a non-codebook-based UL transmission, transmitting to the UE an UL grant comprising information indicating the outcome of the determination.

Figure 17:
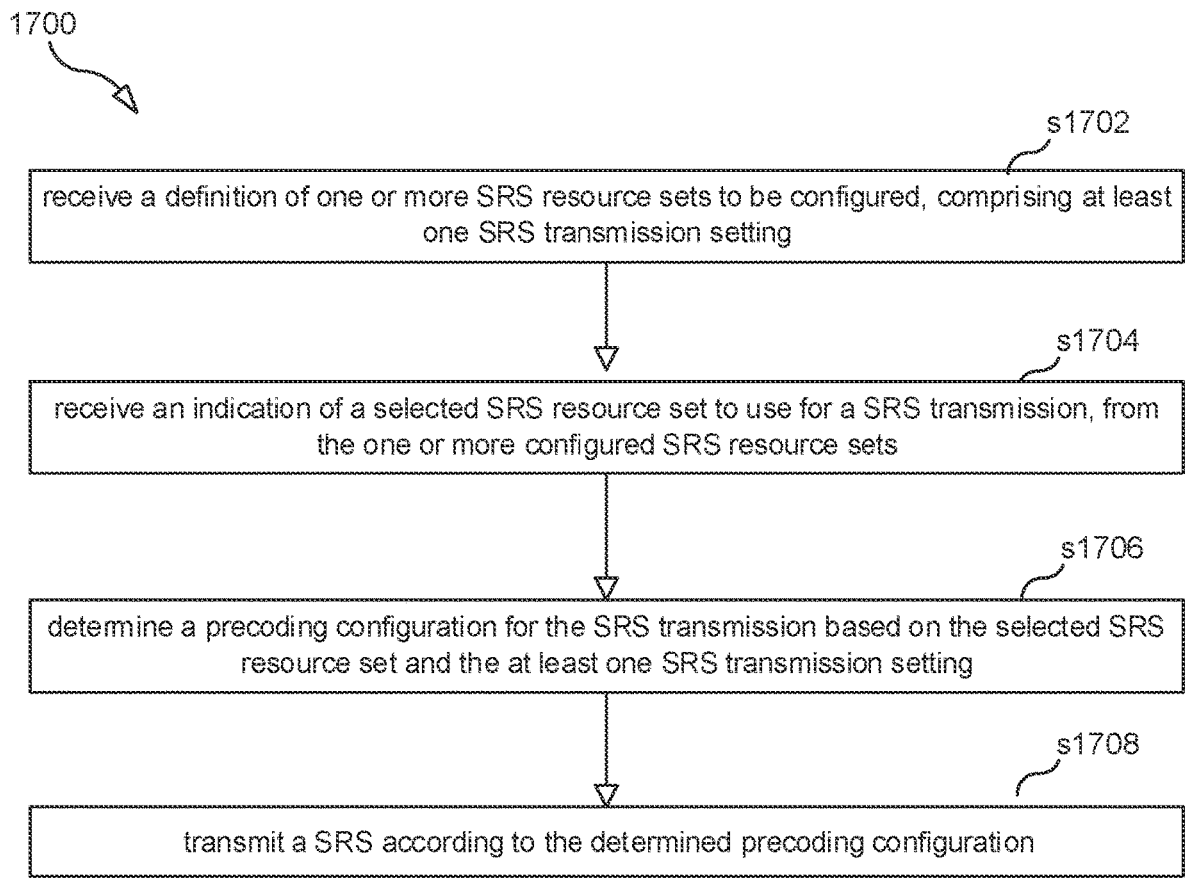
FIG. 17 is an example flow chart in accordance with some embodiments.

FIG. 17 is a flow chart illustrating a method 1700 in accordance with particular embodiments. The method may begin at step s1702 in which a wireless device for performing sounding reference signal (SRS) transmission receives a definition of one or more SRS resource sets to be configured, comprising at least one SRS transmission setting. As described above the definition of one of more SRS resource sets may be achieved by radio resource configuration of SRS resource IEs such comprised in sets identified by an SRS resource set identifier. The method proceeds with step s1704 with the wireless device receiving an indication of a selected SRS resource set to use for a SRS transmission, from the one or more configured SRS resource sets. The method then proceeds with step s1706 with the wireless device determining a precoding configuration for the SRS transmission based on the selected SRS resource set and the at least one SRS transmission setting. As described above and further clarified below, the wireless device may determine whether the wireless device shall select a precoder for the SRS transmission or not, e.g. whether codebook or non-codebook precoding is determined. The method then completes with the wireless device transmitting a SRS according to the determined precoding configuration at step s1708.

In some examples the determining a precoding configuration for the SRS transmission comprises determining whether codebook based precoding or non-codebook based precoding is to be applied.

In some aspects the determining the precoding configuration for the SRS transmission is based on a precoding indicator. In some examples of this aspect the precoding indicator is comprised in the at least one SRS transmission setting. In some examples the precoding indicator is a downlink reference signal, DL RS, identifier which identifies an associated DL RS.

In some aspects the determining a precoding configuration for the SRS transmission comprises determining whether to apply reciprocity-based precoding for the SRS transmission. As described above reciprocity based precoding means that the precoder for the SRS transmission is selected based on measured DL signals wherein reciprocity is assumed between the DL beams and the UL SRS transmission. In some examples the selected SRS resource comprises an association to a DL RS and the method further comprising determining a reciprocity-based precoder for the SRS transmission based on the associated DL RS.

In some examples the SRS transmission is an aperiodic transmission and the indication of a selected SRS resource set comprises a DL control information (DCI) indicator. In other examples the SRS transmission is periodic or semi-persistent.

Figure 18:
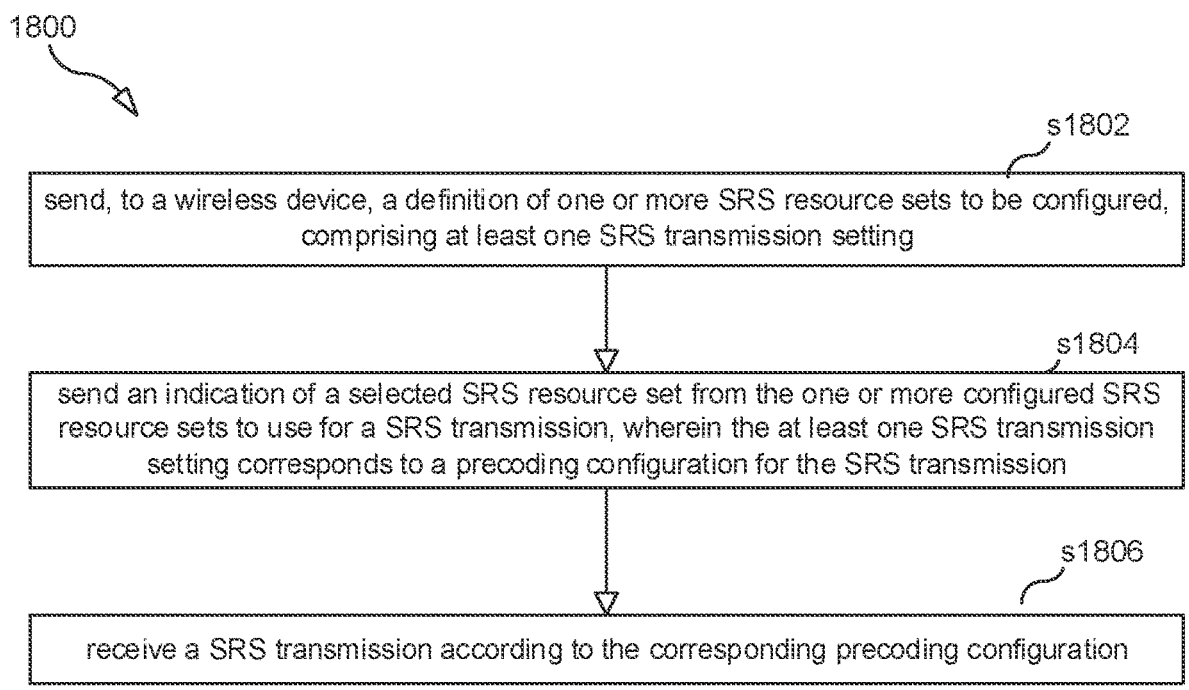
FIG. 18 is an example flow chart in accordance with some embodiments.

FIG. 18 is a flow chart illustrating a method 1800 in accordance with particular embodiments. The method may begin at step s1802 in which a network node sends, to a wireless device, a definition of one or more SRS resource sets to be configured, comprising at least one SRS transmission setting. As described above the definition of one of more SRS resource sets may be achieved by radio resource configuration of SRS resource IEs such comprised in sets identified by an SRS resource set identifier. The method proceeds with step s1804 with the network node sending an indication of a selected SRS resource set from the one or more configured SRS resource sets to use for a SRS transmission, wherein the at least one SRS transmission setting corresponds to a precoding configuration for the SRS transmission. The method continues with the network node receiving a SRS transmission according to the corresponding precoding configuration. The corresponding precoding configuration for the SRS transmission may comprises one of codebook based precoding or non-codebook based precoding. The selected resource set may comprises a precoding indicator. In some examples the precoding indicator may be comprised in the at least one SRS transmission setting. In some examples the precoding indicator is a downlink reference signal, DL RS, identifier which identifies an associated DL RS. The corresponding precoding configuration for the SRS transmission may comprises reciprocity-based precoding for the SRS transmission. The selected SRS resource may comprises an association to a DL RS and the corresponding precoding configuration comprises reciprocity-based precoding based on the associated DL RS. The SRS transmission may be an aperiodic transmission and the indication of a selected SRS resource set comprises a DL control information (DCI) indicator. Alternatively the SRS transmission may be periodic or semi-persistent.

The following are some numerated examples:

A1. A method, comprising: 1) a UE obtaining a sounding reference signal (SRS) transmission setting; 2) the UE performing an SRS transmission process in accordance with the obtained SRS transmission setting, wherein performing the SRS transmission process comprises: 2a) the UE using a DL RS resource indicator to obtain a first candidate precoder matrix; 2b) the UE precoding an SRS using the first candidate precoder matrix to produce the first precoded SRS; and 2c) the UE transmitting the first precoded SRS.

A2. A method, comprising: 1) a UE obtaining an SRS transmission setting; 2) the UE determining whether the SRS transmission setting includes a DL RS resource indicator; and 3) as a result of determining that the SRS transmission setting includes the DL RS resource indicator, the UE performs an SRS transmission process comprising: 3a) the UE using the DL RS resource indicator to obtain a first candidate precoder matrix; 3b) the UE precoding an SRS using the first candidate precoder matrix to produce a first precoded SRS; and 3c) the UE transmitting the first precoded SRS.

A3. A method, comprising: 1) a UE receiving downlink control information (DCI) carried on a physical downlink control channel, wherein the DCI comprises information pointing to an SRS transmission setting; 2) the UE determining whether the DCI includes a DL RS resource indicator; and 3) as a result of determining that the DCI includes the DL RS resource indicator, the UE performs an SRS transmission process comprising: 3a) the UE using the DL RS resource indicator to obtain a first candidate precoder matrix; 3b) the UE using the first candidate precoder matrix to precode an SRS identified in the SRS transmission setting to produce a first precoded SRS; and 3c) the UE transmitting the first precoded SRS.

A4. The method of any one of embodiments A1-A3, wherein the SRS transmission setting comprises an SRS resource set information element (IE), the SRS resource set IE comprises information identifying a set of one or more SRS resource IEs (e.g., a list of SRS resource IDs), and the SRS resource set IE further comprises the DL RS resource indicator.

A5. The method of embodiment any one of embodiments A1-A3, wherein the SRS transmission setting comprises an SRS resource IE, and the SRS resource IE comprises the DL RS resource indicator.

A6. The method of embodiment A5, wherein the SRS transmission setting further comprises an SRS resource set information element (IE) and the SRS resource set IE comprises information identifying a set of one or more SRS resource IEs.

A7. The method of any one of embodiments A1-A6, wherein the SRS transmission process further comprises: 3d) the UE using the DL RS resource indicator to obtain a second candidate precoder matrix; 3e) the UE precoding an SRS using the second candidate precoder matrix to produce a second precoded SRS; and 3f) the UE transmitting the second precoded SRS.

A8. The method of any one of embodiments A1-A7, further comprising: the UE receiving downlink control information (DCI) carried on a physical downlink control channel, wherein the DCI comprises information pointing to the SRS transmission setting, wherein the UE obtains the SRS transmission setting in response to receiving the DCI, wherein the UE obtains the SRS transmission setting by retrieving it from a storage unit internal to the UE.

A9. The method of any one of embodiments A1-A8, wherein the DCI includes the DL RE resource indicator.

A10. The method of any one of embodiments A1-A9, wherein the DL RS resource indicator is one of: an RS resource identifier (ID) (e.g., a CSI-RS resource ID), and an indicator (e.g., TCI) that comprises one more RS resource IDs.

A11. The method of any one of embodiments A1-A10, wherein the UE stores a set of one or more candidate precoder matrices, wherein the set of candidate precoder matrices is associated with the DL RS resource indicator, and using the DL RS resource indicator to obtain the first candidate precoder matrix comprises: using the DL RS resource indicator to identify the set of candidate precoder matrices and selecting the first candidate precoder matrix from the set of candidate precoder matrices.

A12. The method of any one of embodiments A1-A10, wherein the DL RS resource indicator points to a previously transmitted DL RS, and using the DL RS resource indicator to obtain the first candidate precoder matrix comprises: the UE performing a measurement with respect to the DL RS and the UE determining the first candidate precoder matrix based on this measurement.

A13. The method of any one of embodiments A1-A10, wherein the DL RS resource indicator points to a DL RS that will be transmitted to the UE, and using the DL RS resource indicator to obtain the first candidate precoder matrix comprises: the UE receiving the DL RS, the UE performing a measurement with respect to the received DL RS, and the UE determining the first candidate precoder matrix based on this measurement.

A14. The method of any of the previous embodiments, further comprising: providing user data; and forwarding the user data to a host computer via a transmission to a base station.

A15. A method, the method comprising: 1) a UE receiving downlink control information (DCI) carried on a physical downlink control channel, wherein the DCI comprises information pointing to an SRS transmission setting; and 2) as a result of receiving the DCI, the UE performing an SRS transmission process in accordance with the SRS transmission setting, the SRS transmission process comprising: 2a) the UE determining whether the DCI includes a DL RS resource indicator; and 2b) as a result of determining that the DCI does not include a DL RS resource indicator, the UE transmitting a non-precoded SRS in accordance with the SRS transmission setting.

A16. A method, the method comprising: 1) a UE receiving downlink control information (DCI) carried on a physical downlink control channel, wherein the DCI comprises information pointing to an SRS transmission setting; and 2) as a result of receiving the DCI, the UE performing an SRS transmission process in accordance with the SRS transmission setting, the SRS transmission process comprising: 2a) the UE determining whether the SRS transmission setting includes a DL RS resource indicator; and 2b) as a result of determining that the SRS transmission resource does not include a DL RS resource indicator, the UE transmitting a non-precoded SRS in accordance with the SRS transmission setting.

B1. A method, comprising: a TRP (e.g., a base station) obtaining an SRS transmission setting, wherein the SRS transmission setting includes a DL RS resource indicator, and the TRP using a control protocol (e.g., RRC) to transmit the SRS transmission setting to a UE.

B2. The method of claim B1, further comprising: transmitting to the UE downlink control information (DCI) comprising information to enable the UE to retrieve the SRS transmission setting.

B3. A method, comprising: determining that a UE should perform an SRS transmission process; and as a result of determining that a UE should perform the SRS transmission process, triggering the UE to perform the SRS transmission process, wherein triggering the UE to perform the SRS transmission process comprises transmitting to the UE control information (e.g., Down Link Control Information (DCI)), wherein the control information comprises: i) information to enable the UE to retrieve an SRS transmission setting and ii) a DL RS resource indicator.

B4. The method of claim B2 or B3, further comprising: after transmitting the control information, receiving from the UE a precoded SRS and a non-precoded SRS; after receiving the precoded SRS and the non-precoded SRS, determining, based on the received precoded SRS and the received non-precoded SRS, whether the UE should perform a codebook-based UL transmission or a non-codebook-based UL transmission; and after determining whether the UE should perform a codebook-based UL transmission or a non-codebook-based UL transmission, transmitting to the UE an UL grant comprising information indicating the outcome of the determination.

B5. The method of any of the previous embodiments, further comprising: obtaining user data transmitted by the UE; and forwarding the user data to a communication device (e.g., a host computer or another UE).

C1. A wireless device, the wireless device comprising: processing circuitry configured to perform any of the steps of any of the Group A embodiments; and power supply circuitry configured to supply power to the wireless device.

C2. A base station, the base station comprising: processing circuitry configured to perform any of the steps of any of the Group B embodiments; power supply circuitry configured to supply power to the base station.

C3. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C4. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein: the processing circuitry of the host computer is configured to execute a host application, thereby providing the user data; and the UE comprises processing circuitry configured to execute a client application associated with the host application.

C8. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein: the processing circuitry of the host computer is configured to execute a host application, thereby providing the user data; and the UE's processing circuitry is configured to execute a client application associated with the host application.

C15. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein: the processing circuitry of the host computer is configured to execute a host application; and the UE's processing circuitry is configured to execute a client application associated with the host application, thereby providing the user data.

C21. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

C22. A method implemented in a communication system including a host computer, a base station and a user equipment (UE), the method comprising: at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising: at the UE, executing a client application, thereby providing the user data to be transmitted; and at the host computer, executing a host application associated with the client application.

C25. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein: the processing circuitry of the host computer is configured to execute a host application; the UE is configured to execute a client application associated with the host application, thereby providing the user data to be received by the host computer.

C30. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

D1. A method performed by a communication system including a host computer, a base station and a wireless device, comprising: at the host computer, providing user data; at the host computer, initiating a transmission carrying the user data to the wireless device via a cellular network comprising the base station, wherein the wireless device: receives a definition of one or more SRS resource sets to be configured, comprising at least one SRS transmission setting; receives an indication of a selected SRS resource set to use for a SRS transmission, from the one or more configured SRS resource sets; determines a precoding configuration for the SRS transmission based on the selected SRS resource set and the at least one SRS transmission setting; and transmits a SRS according to the determined precoding configuration.

D2. The method according to example D1, further comprising: at the wireless device, receiving precoding weights for a coming downlink transmission and at the wireless device, receiving a downlink transmission carrying the user data from the base station.

D3. A communication system including a host computer comprising: processing circuitry configured to provide user data; and a communication interface configured to forward user data to a cellular network for transmission to a wireless device, wherein the wireless device comprises a radio interface and processing circuitry, the processing circuitry of the wireless device configured to: receive an indication of one or more SRS resource sets to be configured, comprising at least one SRS transmission setting; receive an indication of a selected SRS resource set from the one or more configured SRS resource sets to use for a SRS transmission; determine a precoding configuration for the SRS transmission based on the selected SRS resource set and the at least one SRS transmission setting; and transmit a SRS according to the determined precoding configuration.

D4. A method performed by a communication system including a host computer, a base station and a wireless device, the method comprising: at the host computer, providing user data; and at the host computer, initiating a transmission carrying the user data to the wireless device via a cellular network comprising the base station, wherein the base station: sends, to a wireless device, a definition of one or more SRS resource sets to be configured, comprising at least one SRS transmission setting; sends an indication of a selected SRS resource set from the one or more configured SRS resource sets to use for a SRS transmission, wherein the at least one SRS transmission setting corresponds to a precoding configuration for the SRS transmission; and receives a SRS transmission according to the corresponding precoding configuration.

D5. The method according to example D4, further comprising: at the base station, transmitting precoding weights to the wireless device for a coming downlink transmission; and at the base station, performing a downlink transmission carrying the user data to the wireless device.

D6. The method of example D5, wherein the user data is provided at the host computer by executing a host application, the method further comprising: at the wireless device, executing a client application associated with the host application.

D7. A communication system including a host computer comprising: processing circuitry configured to provide user data; and a communication interface configured to forward the user data to a cellular network for transmission to a wireless device, wherein the cellular network comprises a base station having a radio interface and processing circuitry, the base station's processing circuitry configured to: send, to the wireless device, a definition of one or more SRS resource sets to be configured, comprising at least one SRS transmission setting; send an indication of a selected SRS resource set from the one or more configured SRS resource sets to use for a SRS transmission, wherein the at least one SRS transmission setting corresponds to a precoding configuration for the SRS transmission; and receive a SRS transmission according to the corresponding precoding configuration.

While various embodiments are described above and in the attached appendix, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a wireless device for performing sounding reference signal (SRS) transmission, the method comprising:

receiving in a radio resource control (RRC) message an indication for one or more SRS resource sets to be configured, the message including a precoding indicator;

receiving in a downlink control information (DCI) an indication of a selected one of the one or more SRS resource sets to use for a SRS transmission;

determining that the precoding indicator indicates non-codebook based precoding;

as a result of determining that the precoding indicator indicates non-codebook based precoding, determining a precoder for the SRS transmission based on a measurement of a downlink (DL) reference signal and based on the selected SRS resource set and the precoding indicator; and transmitting the SRS based on the determination.

2. The method of claim 1, wherein the DL reference signal is a CSI-RS and the wireless device assumes TX/RX reciprocity holds.

3. The method of claim 1, wherein the SRS transmission is an aperiodic transmission.

4. A wireless device for performing sounding reference signal (SRS) transmission, the wireless device comprising:

a receiver for receiving 1) a radio resource control (RRC) message comprising an indication for one or more SRS resource sets to be configured and a precoding indicator and 2) downlink control information (DCI) indicating a selected one of the one or more SRS resource sets to use for a SRS transmission; and processing circuitry configured to cause the wireless device to perform a method comprising:

determining whether the precoding indicator indicates non-codebook based precoding;

as a result of determining that the precoding indicator indicates non-codebook based precoding, determining a precoder for the SRS transmission based on a measurement of a downlink (DL) reference signal and based on the selected SRS resource set and the precoding indicator; and transmitting the SRS based on the determination.

5. The wireless device of claim 4, wherein
the DL reference signal is a CSI-RS, and
the wireless device assumes TX/RX reciprocity holds.

6. The wireless device of claim 4, wherein the SRS transmission is an aperiodic transmission.

7. A method performed by a network node, the method comprising:

sending to a wireless device a radio resource control (RRC) message comprising i) an indication for one or more sounding reference signal (SRS) resource sets to be configured and ii) a precoding indicator that causes the wireless device to determine a precoder for an uplink (UL) SRS transmission based on a downlink (DL) reference signal transmitted by the network node, wherein the precoding indicator indicates non-codebook based precoding;

sending to the wireless device downlink control information (DCI) indicating a selected one of the one or more SRS resource sets to use for the UL SRS transmission; and receiving the UL SRS transmission.

8. The method of claim 7, wherein the UL SRS transmission comprises reciprocity-based precoding for the UL SRS transmission.

9. The method of claim 7, wherein the selected SRS resource set comprises an association to a DL reference signal (RS) and the UL SRS transmission comprises reciprocity-based precoding based on the associated DL RS.

10. The method of claim 7, wherein the UL SRS transmission is an aperiodic transmission.

11. A network node, the network node comprising:
memory; and
processing circuitry coupled to the memory, wherein
the network node is configured to perform a method that comprises:
sending to a wireless device a radio resource control (RRC) message comprising i) an indication for one or more sounding reference signal (SRS) resource sets to be configured and ii) a precoding indicator that causes the wireless device to determine a precoder for an uplink (UL) SRS transmission based on a downlink (DL) reference signal transmitted by the network node, wherein the precoding indicator indicates non-codebook based precoding;
sending to the wireless device downlink control information (DCI) indicating a selected one of the one or more SRS resource sets to use for the UL SRS transmission, and
the network node further comprises a receiver for receiving the UL SRS transmission.

12. The network node of claim 11, wherein UL SRS transmission comprises reciprocity-based precoding for the SRS transmission.

13. The network node of claim 11, wherein the selected SRS resource set comprises an association to a DL reference signal (RS) and the UL SRS transmission comprises reciprocity-based precoding based on the associated DL RS.

14. The network node of claim 11, wherein the UL SRS transmission is an aperiodic transmission.

15. A non-transitory computer readable medium storing instructions, which, when executed by processing circuitry of a wireless device, cause the wireless device to perform the method of claim 1.

16. A non-transitory computer readable medium storing instructions, which, when executed by processing circuitry of a network node, cause the network node to perform the method of claim 7.

* * * * *